(12) United States Patent
Oh

(10) Patent No.: US 12,197,886 B2
(45) Date of Patent: Jan. 14, 2025

(54) NEURAL PROCESSING DEVICE AND METHOD FOR CONVERTING DATA THEREOF

(71) Applicant: Rebellions Inc., Seongnam-si (KR)

(72) Inventor: Jinwook Oh, Seongnam-si (KR)

(73) Assignee: Rebellions Inc., Seongnam-si (KR)

( * ) Notice: Subject to any disclaimer, the term of this patent is extended or adjusted under 35 U.S.C. 154(b) by 0 days.

(21) Appl. No.: 18/191,737

(22) Filed: Mar. 28, 2023

(65) Prior Publication Data

US 2023/0315336 A1 Oct. 5, 2023

(30) Foreign Application Priority Data

Apr. 1, 2022 (KR) .......................... 10-2022-0041152

(51) Int. Cl.
*G06F 5/00* (2006.01)
*G06F 3/06* (2006.01)
*G06F 5/06* (2006.01)

(52) U.S. Cl.
CPC .............. *G06F 5/00* (2013.01); *G06F 3/0604* (2013.01); *G06F 3/0656* (2013.01); *G06F 5/06* (2013.01)

(58) Field of Classification Search
CPC ... G06N 3/063; G06F 9/30025; G06F 3/0604; G06F 3/0656; G06F 5/06; G06F 5/00
See application file for complete search history.

(56) References Cited

U.S. PATENT DOCUMENTS

| 11,494,163 | B2* | 11/2022 | Mellempudi | ............ G06N 3/08 |
| 2019/0347553 | A1* | 11/2019 | Lo | ............................. H03M 7/24 |
| 2019/0392287 | A1 | 12/2019 | Ovsiannikov et al. | |
| 2021/0064976 | A1* | 3/2021 | Sun | ........................ G06N 3/063 |

FOREIGN PATENT DOCUMENTS

| JP | WO2020/008643 A1 | 1/2020 |
| KR | 10-2020-0122256 A | 10/2020 |
| KR | 10-2258566 B1 | 6/2021 |

OTHER PUBLICATIONS

Venkataramani, Swagath, et al. "RaPiD: AI accelerator for ultra-low precision training and inference." 2021 ACM/IEEE 48th Annual International Symposium on Computer Architecture (ISCA). IEEE, 2021. (Year: 2021).*

(Continued)

*Primary Examiner* — Benjamin P Geib
(74) *Attorney, Agent, or Firm* — BROADVIEW IP LAW, PC

(57) ABSTRACT

A neural processing device and a method for converting data thereof are provided. The neural processing device comprises a first compute unit configured to receive first input data in first precision and generate first output data in the first precision by performing calculations, a second compute unit configured to receive second input data in second precision which is different from the first precision and generate second output data in the second precision by performing calculation, and a first converting buffer configured to receive and store the first output data, generate the second input data by converting the first output data into the second precision, and transmit the second input data to the second compute unit.

14 Claims, 34 Drawing Sheets

(56) References Cited

OTHER PUBLICATIONS

Oh, Jinwook, et al. "A 3.0 TFLOPS 0.62 V scalable processor core for high compute utilization AI training and inference." 2020 IEEE Symposium on VLSI Circuits. IEEE, 2020. (Year: 2020).*

Venkataramani, Swagath, et al. "Efficient AI system design with cross-layer approximate computing." Proceedings of the IEEE 108.12 (2020): 2232-2250. (Year: 2020).*

Shukla, Sunil, et al. "A scalable multi-TeraOPS core for AI training and inference." IEEE Solid-State Circuits Letters 1.12 (2018): 217-220. (Year: 2018).*

Judd, Patrick, et al. "Proteus: Exploiting numerical precision variability in deep neural networks." Proceedings of the 2016 International Conference on Supercomputing. 2016. (Year: 2016).*

Moons, Bert, and Marian Verhelst. "An energy-efficient precision-scalable ConvNet processor in 40-nm CMOS." IEEE Journal of solid-state Circuits 52.4 (2016): 903-914. (Year: 2016).*

Lee, Sae Kyu, et al. "A 7-nm four-core mixed-precision AI chip with 26.2-TFLOPS hybrid-FP8 training, 104.9-TOPS INT4 inference, and workload-aware throttling." IEEE Journal of Solid-State Circuits 57.1 (2021): 182-197. (Year: 2021).*

Office Action for KR 10-2022-0041152 by Korean Intellectual Property Office dated Mar. 21, 2024.

Office Action for KR 10-2022-0041152 by Korean Intellectual Property Office dated Nov. 26, 2024.

* cited by examiner

NEURAL PROCESSING DEVICE AND METHOD FOR CONVERTING DATA THEREOF

CROSS-REFERENCE TO RELATED APPLICATION

This application claims priority under 35 U.S.C § 119 to Korean Patent Application No. 10-2022-0041152 filed in the Korean Intellectual Property Office on Apr. 1, 2022, the entire contents of which are hereby incorporated by reference.

TECHNICAL FIELD

The disclosure relates to a neural processing device and a method for converting data thereof. Specifically, the disclosure relates to a neural processing device to change precision by using a buffer memory required for data flow and a method for converting data thereof.

BACKGROUND

For the last few years, artificial intelligence technology has been the core technology of the Fourth Industrial Revolution and the subject of discussion as the most promising technology worldwide. The biggest problem with such artificial intelligence technology is computing performance. For artificial intelligence technology which realizes human learning ability, reasoning ability, perceptual ability, natural language implementation ability, etc., it is of utmost important to process a large amount of data quickly.

The central processing unit (CPU) or graphics processing unit (GPU) of off-the-shelf computers was used for deep-learning training and inference in early artificial intelligence, but had limitations on the tasks of deep-learning training and inference with high workloads, and thus, neural processing units (NPUs) that are structurally specialized for deep learning tasks have received a lot of attention.

The neural processing device requires a buffer memory for data flow therein. The buffer memory may temporarily store data for a short clock and transmit the data to a module and may be used for synchronization and a correct transmission of data.

Meanwhile, precision of data is a form of representing data and has to be converted correctly before calculation is performed. Several calculation modules in the neural network processing device may set various types of precision for various reason, and lots of resources have to be used for conversion of the precision.

Accordingly, implementing a method of converting precision in a buffer memory rather than a calculation module may be a very good way in terms of hardware resources.

The description set forth in the background section should not be assumed to be prior art merely because it is set forth in the background section. The background section may describe aspects or embodiments of the disclosure.

SUMMARY

Aspects of the disclosure provide a neural processing device that maximizes efficiency by converting precision during data transmission.

Aspects of the disclosure provide a method for converting data of a neural processing device that maximizes efficiency by converting precision during the data transmission.

According to some aspects of the disclosure, a neural processing device comprises: a first compute unit configured to receive first input data in first precision and generate first output data in the first precision by performing calculations; a second compute unit configured to receive second input data in second precision which is different from the first precision and generate second output data in the second precision by performing calculations; and a first converting buffer configured to receive and store the first output data, generate the second input data by converting the first output data into the second precision, and transmit the second input data to the second compute unit.

According to some aspects, the neural processing device, further comprises: a second converting buffer configured to convert the first input data in the second precision into the first precision and provide the converted first input data to the first compute unit.

According to some aspects, the neural processing device, further comprises: a memory unit configured to store the second output data in the second precision and provide the first input data in the second precision to the second converting buffer.

According to some aspects, the neural processing device, further comprises: a third converting buffer configured to receive the second output data in the second precision from the second compute unit and convert the second output data into the first precision.

According to some aspects, the first converting buffer comprises: an input converting registers configured to receive the first output data in the first precision and convert the first output data into the second input data in the second precision; a storage configured to receive the second input data from the input converting register and store the second input data; and an output register configured to receive the second input data from the storage and transmit the second input data to the second compute unit.

According to some aspects, the first converting buffer comprises: an input converting registers configured to receive the first output data in the first precision and convert the first output data into the second input data in the second precision; a storage configured to receive the second input data from the input converting register and store the second input data; and an output register configured to receive the second input data from the storage and transmit the second input data to the second compute unit.

According to some aspects, the first converting buffer has a first in first out (FIFO) structure.

According to some aspects, the first compute unit includes a plurality of processing elements.

According to some aspects, the first compute unit has a coarse-grained reconfigurable array (CGRA) structure.

According to some aspects, the second compute unit is a vector unit that performs one-dimensional calculations.

According to some aspects, a number of the first output data is different from a number of the second input data.

According to some aspects of the disclosure, a method for converting data of a neural processing device, comprises: receiving first input data in first precision by a first compute unit; generating first output data in the first precision by the first compute unit; generating, by a first converting buffer, second input data by receiving the first output data and converting the first output data into second precision different from the first precision; receiving the second input data in the second precision by the second compute unit; and generating second output data in the second precision by the second compute unit.

According to some aspects, generating the second input data comprises: receiving the first output data by an input converting register; generating the second input data by converting the first output data into the second precision; storing the second input data in a storage; transmitting the second input data to an output register; and outputting the second input data.

According to some aspects, generating the second input data comprises: receiving the first output data by an input register; storing the first output data in a storage; transmitting the first output data to an output converting register; generating the second input data by converting the first output data into the second precision; and outputting the second input data.

According to some aspects, the first compute unit includes a plurality of processing elements, and the PE array receives i pieces of first input data in the first precision and generates j pieces of the first output data in the first precision.

According to some aspects, the first converting buffer has a FIFO structure, and the first converting buffer receives the j pieces of first output data and converts the j pieces of the first output data into k pieces of the second input data in the second precision.

According to some aspects, the second compute unit is a vector unit that performs one-dimensional calculations, receives the k pieces of the second output data, and generates the second output data.

According to some aspects, generating the second output data comprises: outputting the second output data in the second precision by the vector unit; transmitting, by a first FIFO buffer, h pieces of the second output data to an L0 memory; and storing the h pieces of the second output data in the L0 memory.

According to some aspects, converting into the k pieces of the second input data in the second precision comprises: converting the j pieces of the first output data in the first precision into j pieces of the second input data in the second precision; and generating k pieces of the second input data in the second precision by merging the j pieces of the second input data in the second precision.

According to some aspects, receiving the first input data comprises: transmitting h pieces of the first input data in the first precision by the L0 memory; and receiving the first input data and outputting i pieces of the first input data in the first precision by the first FIFO buffer.

Aspects of the disclosure are not limited to those mentioned above, and other objects and advantages of the disclosure that have not been mentioned can be understood by the following description, and will be more clearly understood by embodiments of the disclosure. In addition, it will be readily understood that the objects and advantages of the disclosure can be realized by the means and combinations thereof set forth in the claims.

The neural processing device and the method for converting data thereof according to the disclosure can minimize timing resources required for converting data by performing precision conversion in an essential buffer memory for data flow.

In addition, precision conversion logic may be excluded in a processing unit, and thus, power consumption can be reduced, and concentration of resources may be prevented.

In addition to the foregoing, the specific effects of the disclosure will be described together while elucidating the specific details for carrying out the embodiments below.

DETAILED DESCRIPTION OF THE PREFERRED EMBODIMENTS

Figure 1:
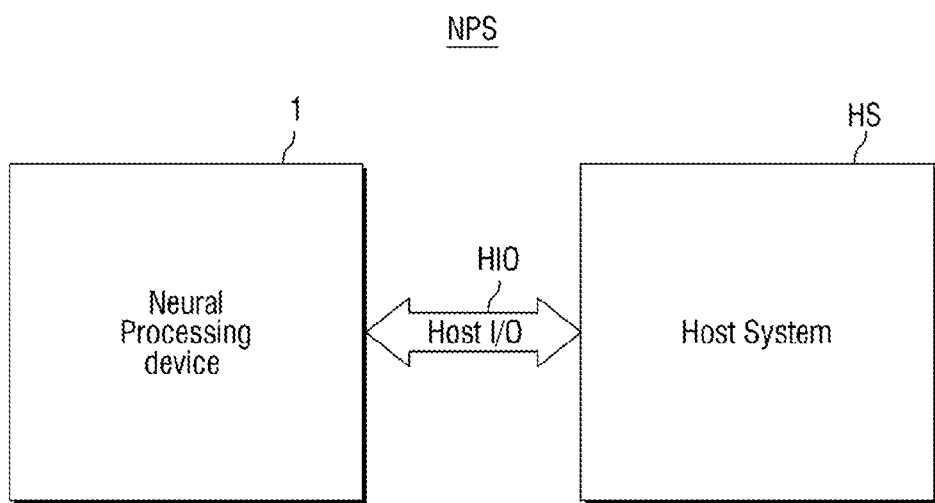
FIG. 1 is a block diagram illustrating a neural processing system according to some embodiments of the disclosure.

The terms or words used in the disclosure and the claims should not be construed as limited to their ordinary or lexical meanings. They should be construed as the meaning and concept in line with the technical idea of the disclosure based on the principle that the inventor can define the concept of terms or words in order to describe his/her own embodiments in the best possible way. Further, since the embodiment described herein and the configurations illustrated in the drawings are merely one embodiment in which the disclosure is realized and do not represent all the technical ideas of the disclosure, it should be understood that there may be various equivalents, variations, and applicable examples that can replace them at the time of filing this application.

Although terms such as first, second, A, B, etc. used in the description and the claims may be used to describe various components, the components should not be limited by these terms. These terms are used only for the purpose of distinguishing one component from another. For example, a first component may be referred to as a second component, and similarly, a second component may be referred to as a first component, without departing from the scope of the disclosure. The term 'and/or' includes a combination of a plurality of related listed items or any item of the plurality of related listed items.

The terms used in the description and the claims are merely used to describe particular embodiments and are not intended to limit the disclosure. Singular expressions include plural expressions unless the context explicitly indicates otherwise. In the application, terms such as "comprise," "have," "include", "contain," etc. should be understood as not precluding the possibility of existence or addition of features, numbers, steps, operations, components, parts, or combinations thereof described herein. Terms, such as a "circuit" or "circuitry", refers to a circuit in hardware but may also refer to a circuit in software.

Unless otherwise defined, the phrases "A, B, or C," "at least one of A, B, or C," or "at least one of A, B, and C" may refer to only A, only B, only C, both A and B, both A and C, both B and C, all of A, B, and C, or any combination thereof.

Unless otherwise defined, all terms used herein, including technical or scientific terms, have the same meaning as commonly understood by those of ordinary skill in the art to which the disclosure pertains.

Terms such as those defined in commonly used dictionaries should be construed as having a meaning consistent with the meaning in the context of the relevant art, and are not to be construed in an ideal or excessively formal sense unless explicitly defined in the disclosure.

In addition, each configuration, procedure, process, method, or the like included in each embodiment of the disclosure may be shared to the extent that they are not technically contradictory to each other.

Hereinafter, a neural processing device according to some embodiments of the disclosure will be described with reference to FIGS. 1 to 31.

FIG. 1 is a block diagram illustrating a neural processing system according to some embodiments of the disclosure.

Referring to FIG. 1, a neural processing system NPS according to some embodiments of the disclosure may include a first neural processing device 1, a host system HS, and a host interface HIO.

The first neural processing device 1 may perform calculation by using an artificial neural network. The first neural processing device 1 may be, for example, a device specialized for performing deep learning calculation tasks. However, the embodiment is not limited thereto.

In this case, the first neural processing device 1 may be a processing device other than a neural processing device. That is, the first neural processing device 1 may be a graphics processing unit (GPU), a central processing unit (CPU), or a processing unit of another type. Hereinafter, for the sake of convenience, the first neural processing device 1 will be described as a neural processing device.

The host system HS may instruct the first neural processing device 1 to perform calculation tasks and retrieves result of the calculation tasks. The host system HS may not be specialized for the deep learning calculation tasks compared to the first neural processing device 1. However, the embodiment is not limited thereto.

The host interface HIO may transmit and receive data and control signals to and from the first neural processing device 1 and the host system HS. The host interface HIO may transmit, for example, commands and data of the host system HS to the first neural processing device 1, and accordingly, the first neural processing device 1 may perform calculations. When the calculations completed, the first neural processing device 1 may transmit a result the calculation task to the host system HS in response to an interrupt request. The host interface HIO may be, for example, PCI express (PCIe) but is not limited thereto.

Figure 2:
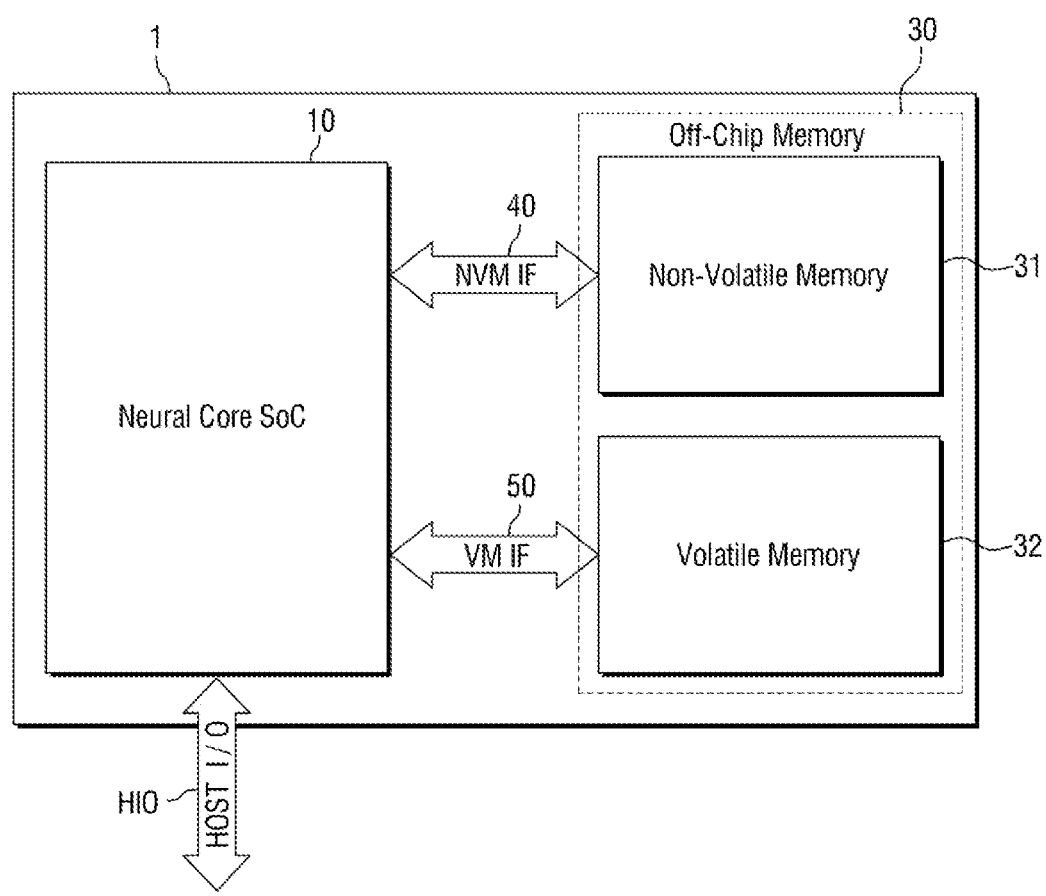
FIG. 2 is a block diagram specifically illustrating the neural processing device of FIG. 1.

FIG. 2 is a block diagram specifically illustrating the neural processing device of FIG. 1.

Referring to FIG. 2, the first neural processing device 1 may include a neural core system on chip (SoC) 10, an off-chip memory 30, a non-volatile memory interface 40, and a volatile memory interface 50.

The neural core SoC 10 may be a system on chip device. The neural core SoC 10 may be an accelerator serving as an artificial intelligence computing unit. The neural core SoC 10 may be any one of, for example, a GPU, a field programmable gate array (FPGA), or an application-specific integrated circuit (ASIC). The embodiment is not limited thereto.

The neural core SoC 10 may exchange data with other external computing units through a separate external interface. In addition, the neural core SoC 10 may be connected to the non-volatile memory 31 through the non-volatile memory interface 40. The neural core SoC 10 may be connected to the volatile memory 32 through the volatile memory interface 50.

The off-chip memory 30 may be arranged outside a chip of the neural core SoC 10. The off-chip memory 30 may include the non-volatile memory 31 and the volatile memory 32.

The non-volatile memory 31 may continuously maintain stored information even when power is not supplied. The non-volatile memory 31 may include at least one of, for example, read-only memory (ROM), programmable ROM (PROM), erasable alterable ROM (EAROM), erasable programmable ROM (EPROM), electrically erasable PROM (EEPROM) (for example, NAND Flash memory, or NOR Flash memory), ultra-violet erasable PROM (UVEPROM), ferroelectric random access memory (FeRAM), magnetoresistive RAM (MRAM), phase-change RAM (PRAM), silicon-oxide-nitride-oxide-silicon (SONOS) flash memory, resistive RAM (RRAM), nanotube RAM (NRAM), a magnetic computer memory device (for example, a hard disk, a diskette drive, or a magnetic tape), an optical disk drive, or three-dimensional (3D) XPoint memory. However, the embodiment is not limited thereto.

Unlike the non-volatile memory 31, the volatile memory 32 may continuously require power to maintain stored information. The volatile memory 32 may include at least one of, for example, dynamic RAM (DRAM), static RAM (SRAM), synchronous dynamic RAM (SDRAM), or double data rate SDRAM (DDR SDRAM). However, the embodiment is not limited thereto.

The non-volatile memory interface 40 may include at least one of, for example, a parallel advanced technology attachment (PATA) interface, a small computer system interface (SCSI), a serial attached SCSI (SAS), a serial advanced technology attachment (SATA) interface, or a PCI express (PCIe) interface. However, the embodiment is not limited thereto.

The volatile memory interface 50 may include at least one of, for example, a single data rate (SDR), a double data rate (DDR), a quad data rate (QDR), or an extreme data rate (XDR). However, the embodiment is not limited thereto.

Figure 3:
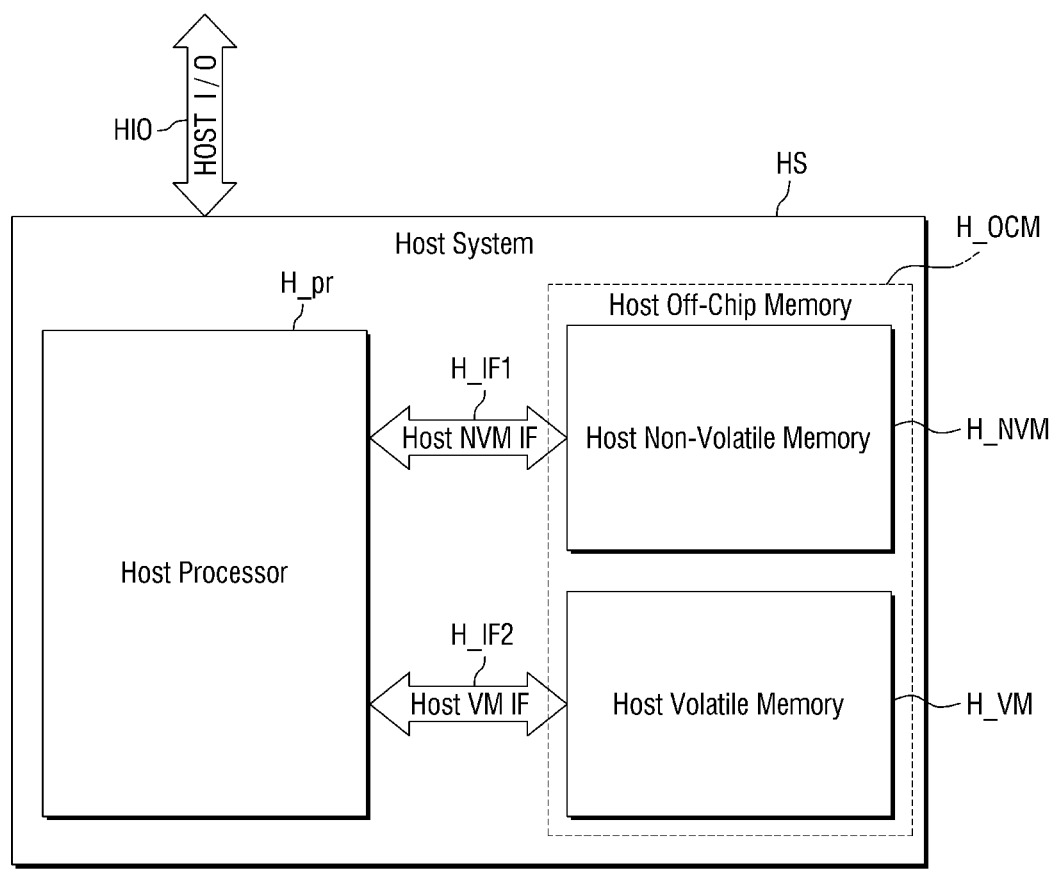
FIG. 3 is a block diagram specifically illustrating the host system of FIG. 1.

FIG. 3 is a block diagram specifically illustrating the host system HS of FIG. 1.

Referring to FIG. 3, the host system HS may include a host processor H_pr, a host off-chip memory H_OCM, a host non-volatile memory interface H_IF1, and a host volatile memory interface H_IF2.

The host processor H_pr may be a controller that controls a system of the first neural processing device 1 and performs calculations of a program. The host processor H_pr may be a general-purpose compute unit and may have low efficiency to perform simple parallel calculations widely used in deep learning. Accordingly, the neural core SoC 10 may perform calculations for deep learning inference and learning operations, thereby achieving high efficiency.

The host processor H_pr may be coupled with a host non-volatile memory H_NVM and the host volatile memory H_VM respectively through the host non-volatile memory interface H_IF1 and the host volatile memory interface H_IF2.

The host processor H_pr may transmit tasks to the neural core SoC 10 through commands. In this case, the host processor H_pr may be a kind of host that gives instructions to the neural core SoC 10, and may be a subject that gives instructions for operations. That is, the neural core SoC 10 may efficiently perform parallel calculation tasks such as deep learning calculation tasks according to instructions from the host processor H_pr.

The host off-chip memory H_OCM may be arranged outside a chip of the host processor H_pr. The host off-chip memory H_OCM may include the host non-volatile memory H_NVM and the host volatile memory H_VM.

The host non-volatile memory H_NVM may maintain stored information even when power is not supplied. The host non-volatile memory H_NVM may include at least one of, for example, ROM, PROM, EAROM, EPROM, EEPROM (for example, NAND Flash memory, or NOR Flash memory), UVEPROM, FeRAM, MRAM, PRAM, SONOS flash memory, RRAM, NRAM, a magnetic computer memory device (for example, a hard disk, a diskette drive, or a magnetic tape), an optical disk drive, or 3D XPoint memory. However, the embodiment is not limited thereto.

Unlike the host non-volatile memory H_NVM, the host volatile memory H_VM may be a memory that continuously requires power to maintain stored information. The host volatile memory H_VM may include at least one of, for example, DRAM, SRAM, SDRAM, or DDR SDRAM. However, the embodiment is not limited thereto.

The host non-volatile memory interface H_IF1 may include at least one of, for example, a PATA interface, a SCSI, a SAS, a SATA interface, or PCIe interface. However, the embodiment is not limited thereto.

Each of the host volatile memory interfaces H_IF2 may include at least one of, for example, an SDR, a DDR, a QDR, or an XDR. However, the embodiment is not limited thereto.

Figure 4:
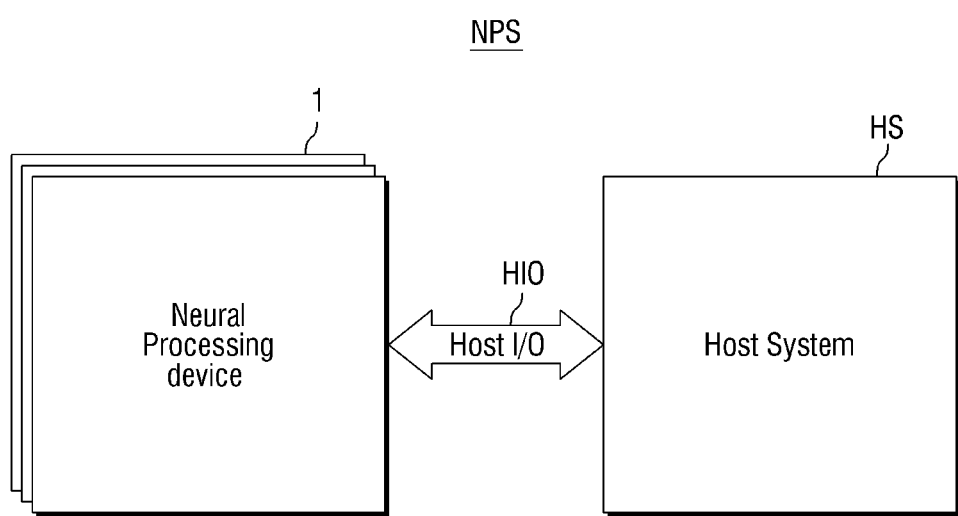
FIG. 4 is a block diagram illustrating a neural processing system according to some embodiments of the disclosure.

FIG. 4 is a block diagram illustrating a neural processing system according to some embodiments of the disclosure.

Referring to FIG. 4, the neural processing system may include a plurality of first neural processing devices 1. Each of the first neural processing devices 1 may be coupled with the host system HS through the host interface HIO. Although one host interface HIO is illustrated in the FIG. 4, the host interface HIO may include a plurality of interfaces respectively coupling the plurality of first neural processing devices 1 with the host system HS.

The plurality of first neural processing devices 1 may exchange data and signals with each other. The plurality of first neural processing devices 1 may transmit and receive data and signals to and from each other through separate interfaces thereof without passing through the host system HS. However, the embodiment is not limited thereto.

Figure 5:
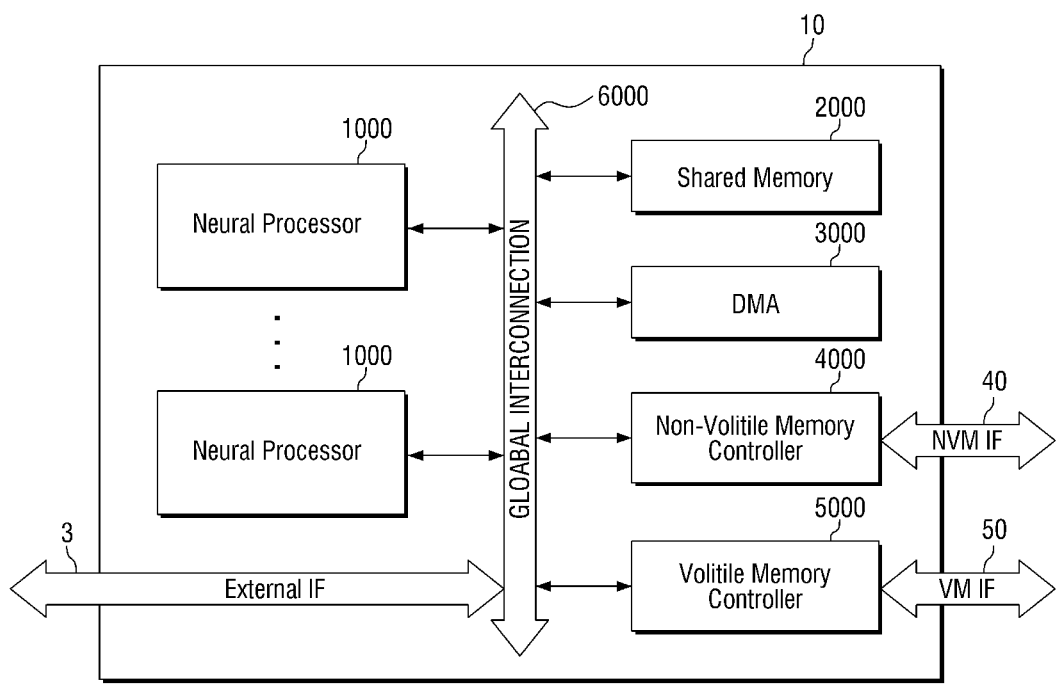
FIG. 5 is a block diagram for illustrating the neural core SoC of FIG. 2.

FIG. 5 is a block diagram specifically illustrating the neural core SoC of FIG. 2.

Referring to FIGS. 2 and 5, the neural core SoC 10 may include at least one neural processor 1000, a shared memory 2000, direct memory access (DMA) 3000, a non-volatile memory controller 4000, a volatile memory controller 5000, and a global interconnection 6000.

The neural processor 1000 may be a compute unit that directly performs calculation tasks. If there exist neural processors 1000 in plurality, calculation tasks may be assigned to respective neural processors 1000. The respective neural processors 1000 may be connected to each other via the global interconnection 6000.

The shared memory 2000 may be a memory shared by multiple neural processors 1000. The shared memory 2000 may store data of each neural processor 1000. In addition, the shared memory 2000 may receive data from the off-chip memory 30, store them temporarily, and transfer them to each neural processor 1000. On the contrary, the shared memory 2000 may also receive data from the neural processor 1000, store them temporarily, and transfer them to the off-chip memory 30 of FIG. 2.

The shared memory 2000 may need a relatively high-speed memory. Accordingly, the shared memory 2000 may include, for example, an SRAM. However, the embodiment is not limited thereto. That is, the shared memory 2000 may include a DRAM as well.

The shared memory 2000 may be a memory corresponding to the SoC level, i.e., level 3 (L3). Accordingly, the shared memory 2000 may also be defined as an L3 shared memory.

The DMA 3000 may directly control the movement of data without the need for the neural processor 1000 to control the input/output of data. Accordingly, the DMA 3000 may control the data movement between memories, thereby minimizing the number of interrupts of the neural processor 1000.

The DMA 3000 may control the data movement between the shared memory 2000 and the off-chip memory 30. Via the authority of the DMA 3000, the non-volatile memory controller 4000 and the volatile memory controller 5000 may perform the movement of data.

The non-volatile memory controller 4000 may control the task of reading from or writing onto the non-volatile memory 31. The non-volatile memory controller 4000 may control the non-volatile memory 31 via the first non-volatile memory interface 40. In this case, the non-volatile memory controller 4000 may be referred to as a non-volatile memory controller circuit, but for the sake of convenience, the terms are unified as a non-volatile memory controller. In addition, the non-volatile memory controller 4000 may be implemented as a circuit or circuitry.

The volatile memory controller 5000 may control the task of reading from or writing onto the volatile memory 32. Further, the volatile memory controller 5000 may perform a refresh task of the volatile memory 32. The volatile memory controller 5000 may control the volatile memory 32 via the first volatile memory interface 50. Likewise, the volatile memory controller 5000 may be referred to as a volatile memory controller circuit, but for the sake of convenience, the terms are unified as a volatile memory controller. In addition, the volatile memory controller 5000 may be implemented as a circuit or circuitry.

The global interconnection 6000 may connect the at least one neural processor 1000, the shared memory 2000, the DMA 3000, the non-volatile memory controller 4000, and the volatile memory controller 5000 to one another. In addition, the external interface 3 may also be connected to the global interconnection 6000. The global interconnection 6000 may be a path through which data travels between the at least one neural processor 1000, the shared memory 2000, the DMA 3000, the non-volatile memory controller 4000, the volatile memory controller 5000, and the external interface 3.

The global interconnection 6000 may transmit not only data but also control signals and may transmit signals for synchronization. That is, in the neural processing device in accordance with some embodiments, each neural processor 1000 may directly transmit and receive a synchronization signal, instead of a separate control processor managing the synchronization signal. Accordingly, it is possible to preclude the latency of the synchronization signal generated by the control processor.

In other words, if there exist neural processors 1000 in plurality, there may be dependencies of individual tasks in which the task of one neural processor 1000 needs to be finished before the next neural processor 1000 can start a new task. The end and start of these individual tasks can be checked via a synchronization signal, and in conventional techniques, a control processor performed the reception of such a synchronization signal and an instruction to start a new task.

However, as the number of neural processors 1000 increases and task dependencies are designed more complicatedly, the number of requests and instructions for this synchronization task has increased exponentially. Therefore, the latency resulting from each request and instruction can greatly reduce the efficiency of tasks.

Accordingly, in the neural processing device in accordance with some embodiments, each neural processor 1000, instead of the control processor, may directly transmit a synchronization signal to another neural processor 1000 according to the dependency of a task. In this case, several neural processors 1000 can perform the synchronization tasks in parallel as compared with the method managed by the control processor, thereby minimizing the latency due to synchronization.

In addition, the control processor needs to perform the task scheduling of the neural processors 1000 according to a task dependency, and the overhead of such scheduling may also increase significantly as the number of neural processors 1000 increases. Accordingly, in the neural processing device in accordance with some embodiments, the scheduling task is also performed by the individual neural processors 1000, and thus, the performance of the device can be improved without even a scheduling burden resulting therefrom.

Figure 6:
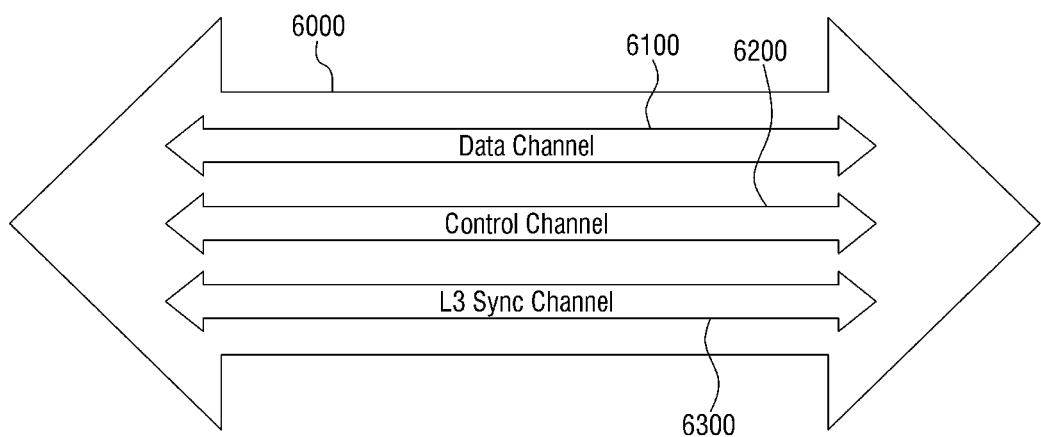
FIG. 6 is a structural diagram for illustrating the global interconnection of FIG. 5.

FIG. 6 is a structural diagram for illustrating the global interconnection of FIG. 5.

Referring to FIG. 6, the global interconnection 6000 may include a data channel 6100, a control channel 6200, and an L3 sync channel 6300.

The data channel 6100 may be a dedicated channel for transmitting data. Through the data channel 6100, the at least one neural processor 1000, the shared memory 2000, the DMA 3000, the non-volatile memory controller 4000, the volatile memory controller 5000, and the external interface 3 may exchange data with one another.

The control channel 6200 may be a dedicated channel for transmitting control signals. Through the control channel 6200, the at least one neural processor 1000, the shared memory 2000, the DMA 3000, the non-volatile memory controller 4000, the volatile memory controller 5000, and the external interface 3 may exchange control signals with one another.

The L3 sync channel 6300 may be a dedicated channel for transmitting synchronization signals. Through the L3 sync channel 6300, the at least one neural processor 1000, the shared memory 2000, the DMA 3000, the non-volatile memory controller 4000, the volatile memory controller 5000, and the external interface 3 may exchange synchronization signals with one another.

The L3 sync channel 6300 may be set as a dedicated channel inside the global interconnection 6000, and thus, may not overlap with other channels and transmit synchronization signals quickly. Accordingly, the neural processing device in accordance with some embodiments does not require new wiring work and may smoothly perform the synchronization task by using the global interconnection 6000.

Figure 7:
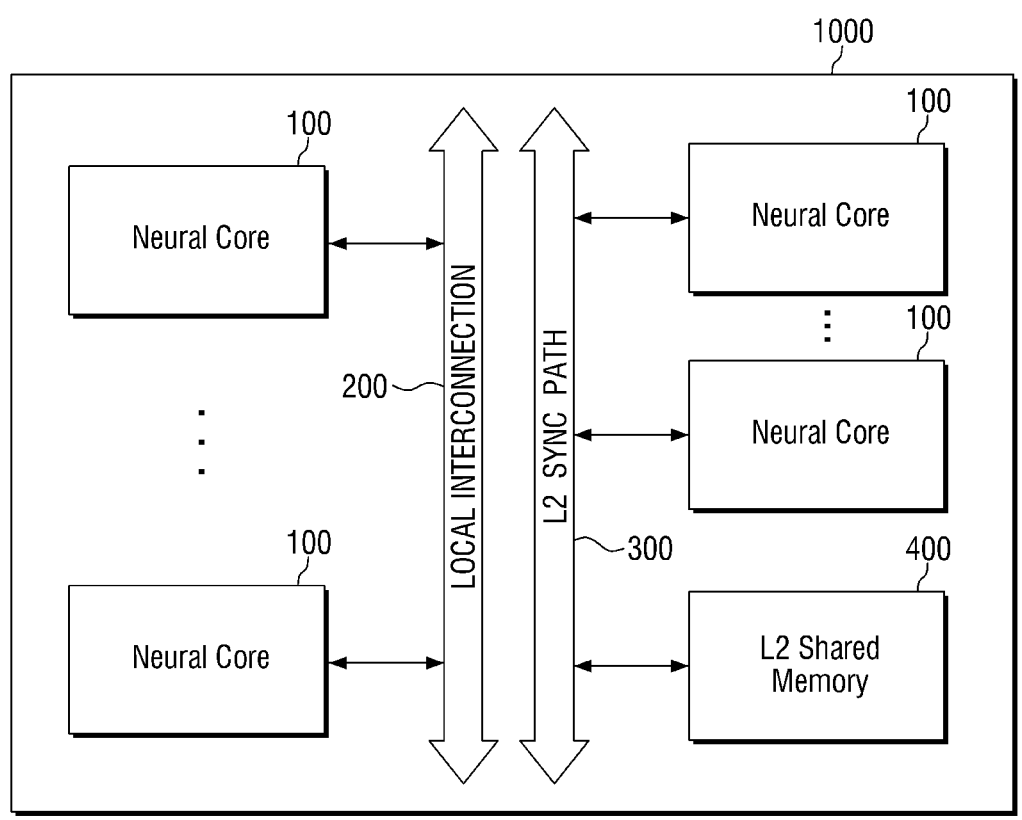
FIG. 7 is a block diagram for illustrating the neural processor of FIG. 5.

FIG. 7 is a block diagram for illustrating the neural processor of FIG. 5.

Referring to FIGS. 5 to 7, the neural processor 1000 may include at least one neural core 100, an L2 shared memory 400, a local interconnection 200, and an L2 sync path 300.

The at least one neural core 100 may share and perform the tasks of the neural processor 1000. The number of neural cores 100 may be, for example, eight. However, the embodiment is not limited thereto. FIGS. 6 and 7 illustrate that a plurality of neural cores are included in the neural processor 1000, but the embodiment is not limited thereto. That is, the neural processor 1000 may be configured with only one neural core.

The L2 shared memory 400 may be a memory shared by the neural cores 100 in the neural processor 1000. The L2 shared memory 400 may store data of each neural core 100. In addition, the L2 shared memory 400 may receive data from the shared memory 2000 of FIG. 5, store them temporarily, and transfer them to each neural core 100. On the contrary, the L2 shared memory 400 may also receive data from the neural core 100, store them temporarily, and transfer them to the shared memory 2000 of FIG. 5.

The L2 shared memory 400 may be a memory corresponding to the neural processor level, i.e., level 2 (L2). The L3 shared memory, i.e., the shared memory 2000 may be shared by the neural processors 1000, and the L2 shared memory 400 may be shared by the neural cores 100.

The local interconnection 200 may connect the at least one neural core 100 and the L2 shared memory 400 to each other. The local interconnection 200 may be a path through which data travels between the at least one neural core 100 and the L2 shared memory 400. The local interconnection 200 may be connected and transmit data to the global interconnection 6000 of FIG. 5.

The L2 sync path 300 may connect the at least one neural core 100 and the L2 shared memory 400 to each other. The L2 sync path 300 may be a path through which synchronization signals of the at least one neural core 100 and the L2 shared memory 400 travel.

The L2 sync path 300 may be formed physically separately from the local interconnection 200. In the case of the local interconnection 200, sufficient channels may not be formed therein, unlike the global interconnection 6000. In such a case, the L2 sync path 300 may be formed separately so that the synchronization signal can be transmitted quickly and without any delay. The L2 sync path 300 may be used for synchronization performed at a level one step lower than that of the L3 sync channel 6300 of the global interconnection 6000.

Figure 8:
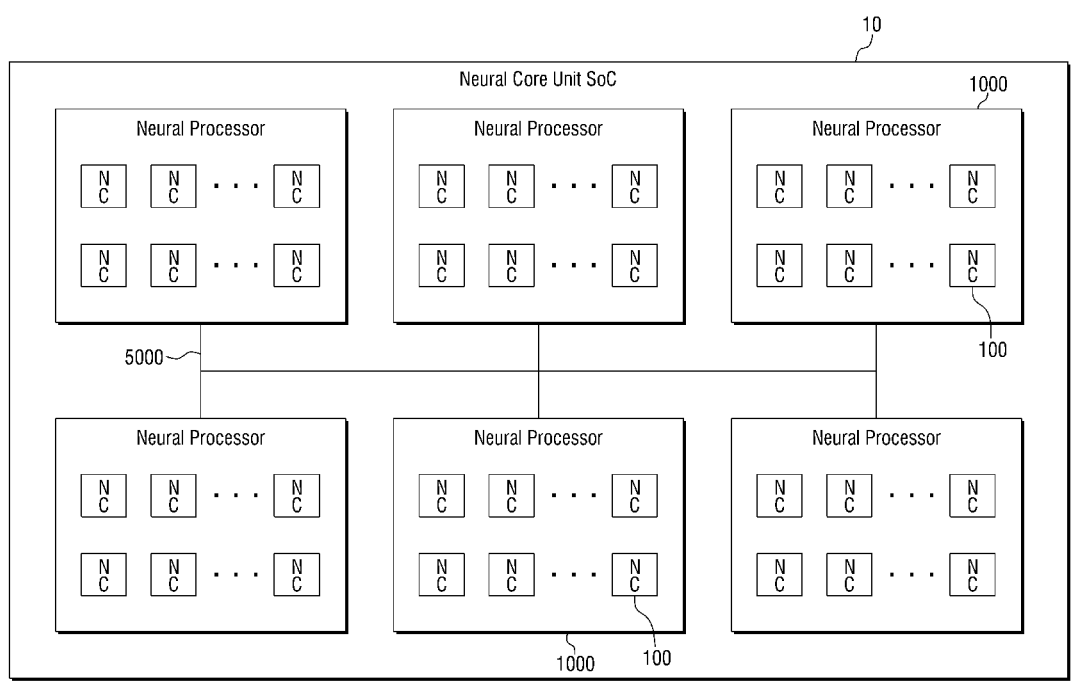
FIG. 8 is a diagram for illustrating a hierarchical structure of a neural processing device in accordance with some embodiments of the disclosure.

FIG. 8 is a diagram for illustrating a hierarchical structure of a neural processing device in accordance with some embodiments of the disclosure.

Referring to FIG. 8, the neural core SoC 10 may include at least one neural processor 1000. Each neural processor 1000 may transmit data to each other via the global interconnection 6000.

The neural processors 1000 may each include at least one neural core 100. The neural core 100 may be a processing unit optimized for deep learning calculation tasks. The neural core 100 may be a processing unit corresponding to one operation of a deep learning calculation task. In other words, a deep learning calculation task can be represented by a sequential or parallel combination of multiple operations. The neural cores 100 may each be a processing unit capable of processing one operation, and may be a minimum compute unit that can be considered for scheduling from the viewpoint of a compiler.

The neural processing device in accordance with the embodiment may configure the scales of the minimum compute unit considered from the viewpoint of compiler scheduling and the hardware processing unit to be the same, so that fast and efficient scheduling and calculation tasks can be performed.

That is, if the processing units into which hardware can be divided are too large compared to calculation tasks, inefficiency of the calculation tasks may occur in driving the processing units. Conversely, it is not appropriate to schedule a processing unit that is a unit smaller than an operation, which is the minimum scheduling unit of the compiler, every time since a scheduling inefficiency may occur and hardware design costs may increase.

Therefore, by adjusting the scales of the scheduling unit of the compiler and the hardware processing unit to be similar in the embodiment, it is possible to simultaneously satisfy the fast scheduling of calculation tasks and the efficient execution of the calculation tasks without wasting hardware resources.

Figure 9:
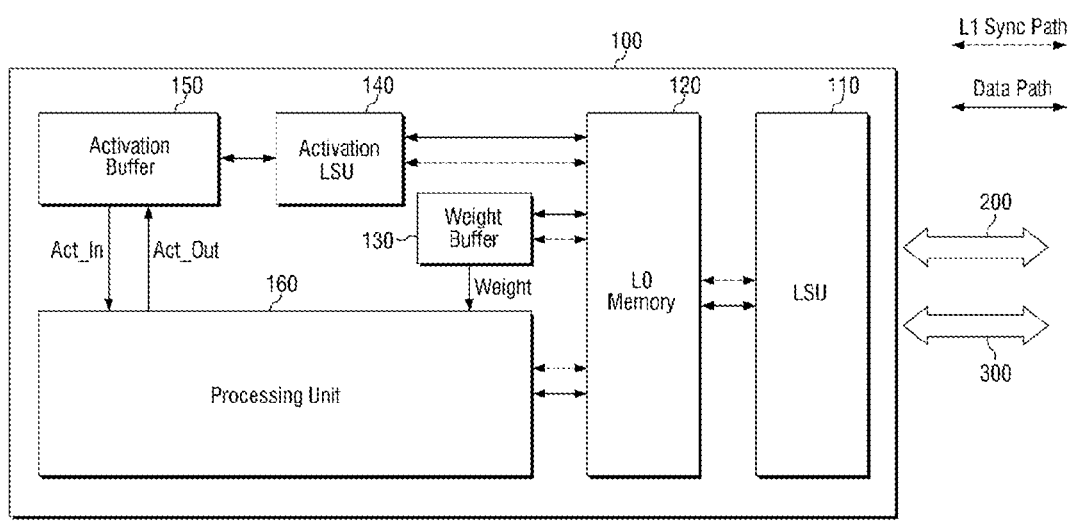
FIG. 9 is a block diagram for illustrating the neural core of FIG. 7 in detail.

FIG. 9 is a block diagram for illustrating the neural core of FIG. 7 in detail.

Referring to FIG. 9, the neural core 100 may include a load/store unit (LSU) 110, an L0 memory 120, a weight buffer 130, an activation LSU 140, an activation buffer 150, and a processing unit 160.

The LSU 110 may receive at least one of data, a control signal, or a synchronization signal from the outside via the local interconnection 200 and the L2 sync path 300. The LSU 110 may transmit at least one of the data, the control signal, or the synchronization signal received to the L0 memory 120. Similarly, the LSU 110 may transfer at least one of the data, the control signal, or the synchronization signal to the outside via the local interconnection 200 and the L2 sync path 300. In this case, the LSU 110 may be referred to as an LSU circuit, but for the sake of convenience, the terms are unified as an LSU. In addition, the LSU 110 may be implemented as a circuit or circuitry.

Figure 10:
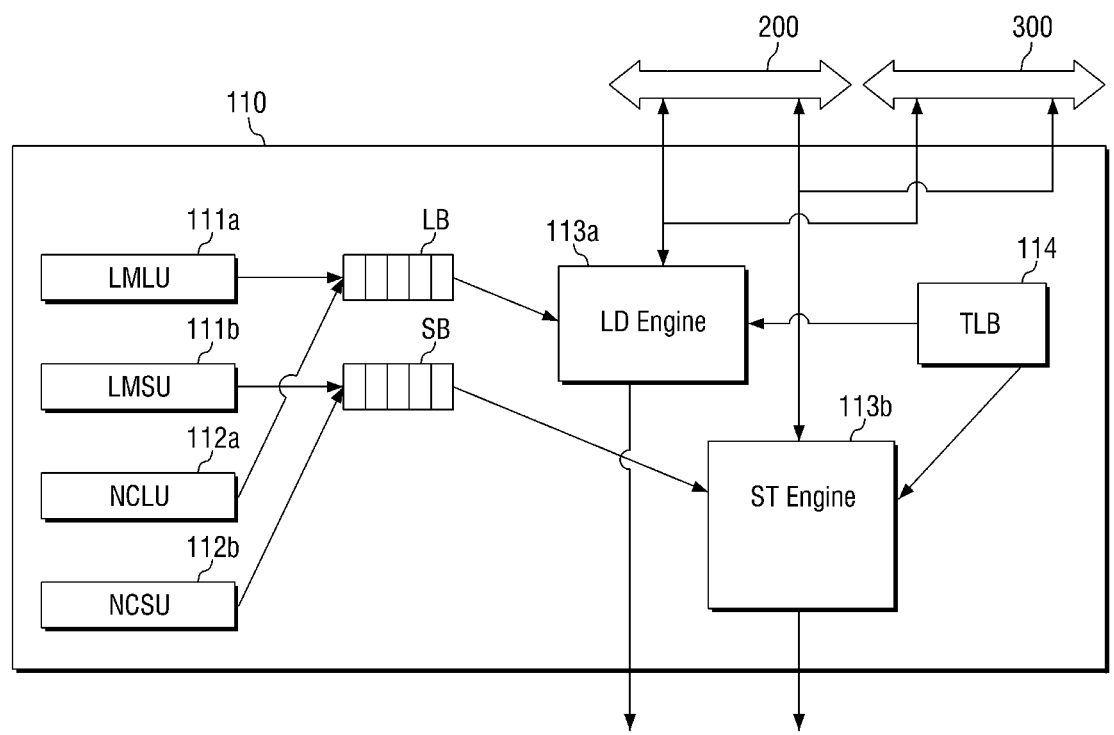
FIG. 10 is a block diagram for illustrating the LSU of FIG. 9 in detail.

FIG. 10 is a block diagram for illustrating the LSU of FIG. 9.

Referring to FIG. 10, the LSU 110 may include a local memory load unit (LMLU) 111a, a local memory store unit (LMSU) 111b, a neural core load unit (NCLU) 112a, a neural core store unit (NCSU) 112b, a load buffer LB, a store buffer SB, a load (LD) engine 113a, a store (ST) engine 113b, and a translation lookaside buffer (TLB) 114.

The local memory load unit 111a, the local memory store unit 111b, the neural core load unit 112a, the neural core store unit 112b, the load engine 113a, and the store engine 113b may be referred to respectively as a local memory load circuit, a local memory store circuit, a neural core load circuit, a neural core store circuit, a load engine circuit, and a store engine circuit. However, for the sake of convenience, the terms are respectively unified as a local memory load unit, a local memory store unit, a neural core load unit, a neural core store unit, a load engine, and a store engine. In addition, the local memory load unit 111a, the local memory store unit 111b, the neural core load unit 112a, the neural core store unit 112b, the load engine 113a, and the store engine 113b may each be implemented as a circuit or circuitry.

The local memory load unit 111a may fetch a load instruction for the L0 memory 120 and issue the load instruction. When the local memory load unit 111a provides the issued load instruction to the load buffer LB, the load buffer LB may sequentially transmit memory access requests to the load engine 113a according to the inputted order.

Further, the local memory store unit 111b may fetch a store instruction for the L0 memory 120 and issue the store instruction. When the local memory store unit 111b provides the issued store instruction to the store buffer SB, the store buffer SB may sequentially transmit memory access requests to the store engine 113b according to the inputted order.

The neural core load unit 112a may fetch a load instruction for the neural core 100 and issue the load instruction. When the neural core load unit 112a provides the issued load instruction to the load buffer LB, the load buffer LB may sequentially transmit memory access requests to the load engine 113a according to the inputted order.

In addition, the neural core store unit 112b may fetch a store instruction for the neural core 100 and issue the store instruction. When the neural core store unit 112b provides the issued store instruction to the store buffer SB, the store buffer SB may sequentially transmit memory access requests to the store engine 113b according to the inputted order.

The load engine 113a may receive the memory access request and retrieve data via the local interconnection 200. At this time, the load engine 113a may quickly find the data by using a translation table of a physical address and a virtual address that has been used recently in the translation lookaside buffer 114. If the virtual address of the load engine 113a is not in the translation lookaside buffer 114, the address translation information may be found in another memory.

The store engine 113b may receive the memory access request and retrieve data via the local interconnection 200. At this time, the store engine 113b may quickly find the data by using a translation table of a physical address and a virtual address that has been used recently in the translation lookaside buffer 114. If the virtual address of the store engine 113b is not in the translation lookaside buffer 114, the address translation information may be found in another memory.

The load engine 113a and the store engine 113b may send synchronization signals to the L2 sync path 300. At this time, the synchronization signal may indicate that the task has been completed.

Referring to FIG. 9 again, the L0 memory 120 is a memory located inside the neural core 100, and may receive all input data required for the tasks by the neural core 100 from the outside and store them temporarily. In addition, the L0 memory 120 may temporarily store the output data calculated by the neural core 100 for transmission to the outside. The L0 memory 120 may serve as a cache memory of the neural core 100.

The L0 memory 120 may transmit an input activation Act_In to the activation buffer 150 and receive an output activation Act_Out via the activation LSU 140. The L0 memory 120 may directly transmit and receive data to and from the processing unit 160, in addition to the activation LSU 140. In other words, the L0 memory 120 may exchange data with each of a PE array 163 and a vector unit 164.

The L0 memory 120 may be a memory corresponding to the level of the neural core. In this case, the L0 memory 120 may be a private memory of the neural core that is not shared, unlike the L2 shared memory 400 and the shared memory 2000.

The L0 memory 120 may transmit data such as activations or weights via a data path. The L0 memory 120 may exchange synchronization signals via an L1 sync path, which is a separate dedicated path. The L0 memory 120 may exchange synchronization signals with, for example, the LSU 110, the weight buffer 130, the activation LSU 140, and the processing unit 160 via the L1 sync path.

The weight buffer 130 may receive a weight from the L0 memory 120. The weight buffer 130 may transfer the weight to the processing unit 160. The weight buffer 130 may temporarily store the weight before transferring the weight.

The input activation Act_In and the output activation Act_Out may refer to input values and output values of the layers of a neural network. In this case, if there are a plurality of layers in the neural network, the output value of the previous layer becomes the input value of the next layer, and thus, the output activation Act_Out of the previous layer may be utilized as the input activation Act_In of the next layer.

The weight may refer to a parameter that is multiplied by the input activation Act_In inputted in each layer. The weight is adjusted and confirmed in the deep learning training phase, and may be used to derive the output activation Act_Out via a fixed value in the inference phase.

The activation LSU 140 may transfer the input activation Act_In from the L0 memory 120 to the activation buffer 150, and the output activation Act_Out from the activation buffer 150 to the on-chip buffer. In other words, the activation LSU 140 may perform both a load task and a store task of the activation.

The activation buffer 150 may provide the input activation Act_In to the processing unit 160 and receive the output activation Act_Out from the processing unit 160. The activation buffer 150 may temporarily store the input activation Act_In and the output activation Act_Out.

The activation buffer 150 may quickly provide the activation to the processing unit 160, in particular, the PE array 163, which has a large amount of calculation, and may quickly receive the activation, thereby increasing the calculation speed of the neural core 100.

The processing unit 160 may be a module that performs calculations. The processing unit 160 may perform not only one-dimensional calculations but also two-dimensional matrix calculations, i.e., convolution operations. The processing unit 160 may receive an input activation Actin, multiply it by a weight, and then add it to generate an output activation Act_Out.

Figure 11:
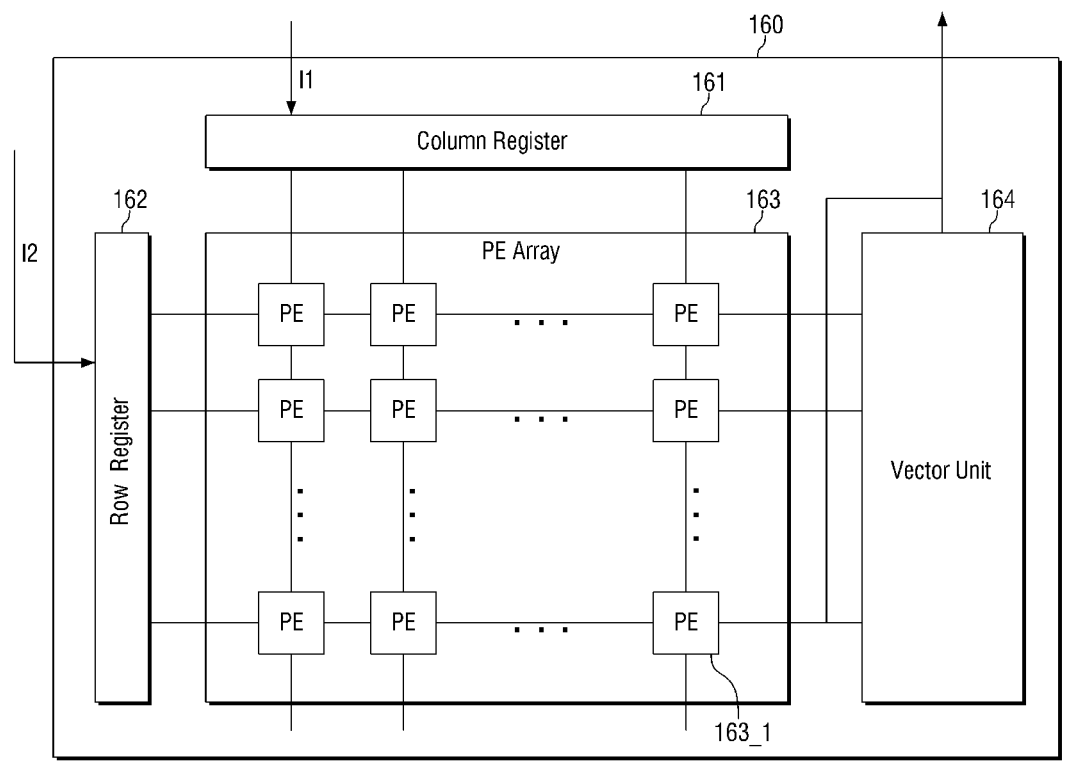
FIG. 11 is a block diagram for illustrating the processing unit of FIG. 9.

FIG. 11 is a block diagram for illustrating the processing unit of FIG. 9 in detail.

Referring to FIG. 9 and FIG. 11, the processing unit 160 may include a PE array 163, a vector unit 164, a column register 161, and a row register 162.

The PE array 163 may receive the input activation Act_In and the weight and perform multiplication on them. In this case, each of the input activation Act_In and the weight may be in the form of matrices and calculated via convolution. Through this, the PE array 163 may generate an output activation Act_Out. However, the embodiment is not limited thereto. The PE array 163 may generate any types of outputs other than the output activation Act_Out as well.

The PE array 163 may include at least one processing element PE. The processing elements PE may be aligned with each other so that each of the processing elements PE may perform multiplication on one input activation Act_In and one weight.

The PE array 163 may sum values for each multiplication to generate a subtotal. This subtotal may be utilized as an output activation Act_Out. The PE array 163 performs two-dimensional matrix multiplication, and thus, may be referred to as a 2D matrix compute unit.

The vector unit 164 may mainly perform one-dimensional calculations. The vector unit 164, together with the PE array 163, may perform deep learning calculations. Through this, the processing unit 160 may be specialized for necessary calculations. In other words, each of the at least one neural core 100 has calculation modules that perform a large amount of two-dimensional matrix multiplications and one-dimensional calculations, and thus, can efficiently perform deep learning tasks.

The column register 161 may receive a first input I1. The column register 161 may receive the first input I1, and distribute them to each column of the processing elements PE.

The row register 162 may receive a second input I2. The row register 162 may receive the second input I2, and distribute them to each row of the processing elements PE.

The first input I1 may be an input activation Act_In or a weight. The second input I2 may be a value other than the first input I1 between the input activation Act_In or the weight. Alternatively, the first input I1 and the second input I2 may be values other than the input activation Act_In and the weight.

Figure 12:
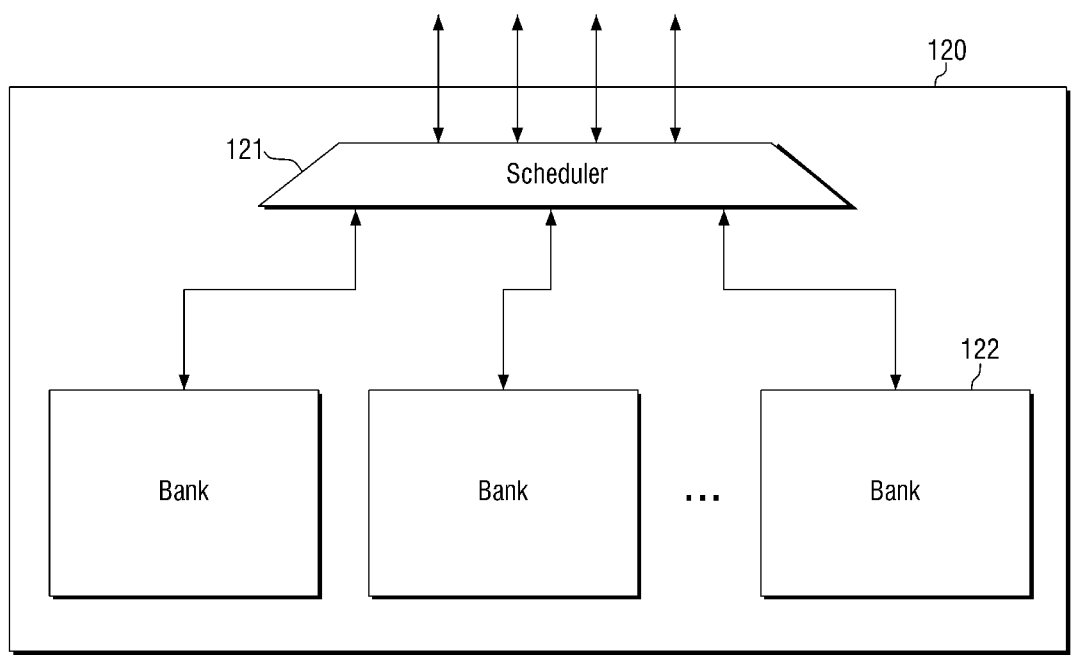
FIG. 12 is a block diagram for illustrating the L0 memory of FIG. 9 in detail.

FIG. 12 is a block diagram for illustrating the L0 memory of FIG. 9 in detail.

Referring to FIG. 12, the L0 memory 120 may include a scheduler 121 and one or more local memory banks 122.

When data is stored in the L0 memory 120, the scheduler 121 may receive data from the load engine 113a. In this case, the local memory bank 122 may be allocated for the data in a round-robin manner. Accordingly, data may be stored in any one of the local memory banks 122.

In contrast to this, when data is loaded from the L0 memory 120, the scheduler 121 may receive the data from the local memory bank 122 and transmit the data to the store engine 113b. The store engine 113b may store the data in the outside through the local interconnection 200. In this case, the scheduler 121 may be referred to as a scheduler circuit, but for the sake of convenience, the term is unified as a scheduler. In addition, the scheduler 121 may be implemented as a circuit or circuitry.

Figure 13:
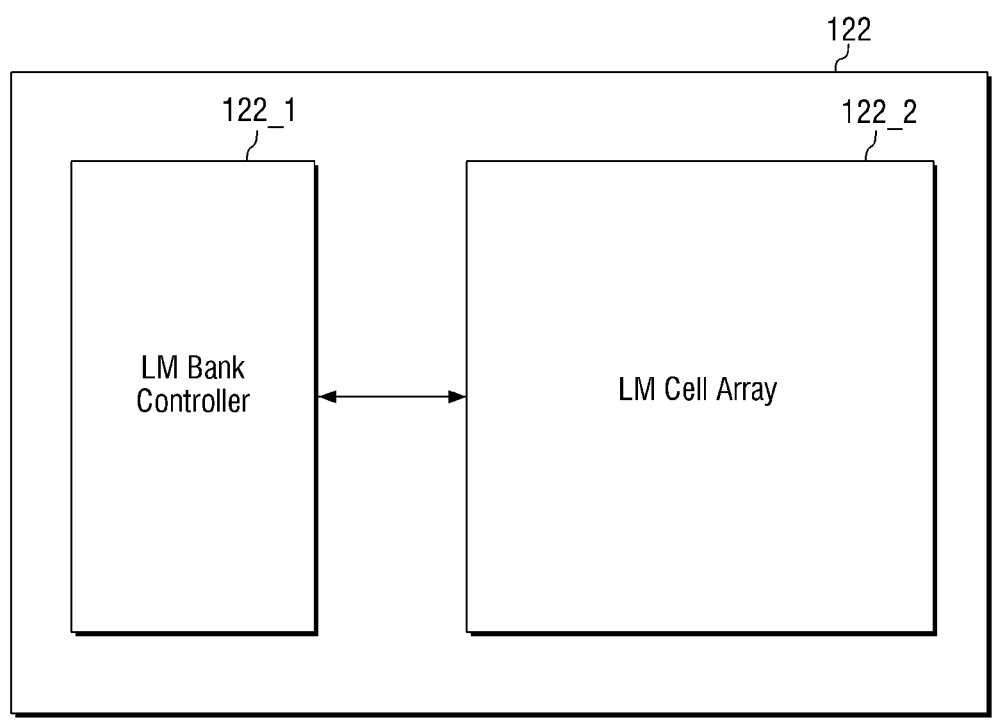
FIG. 13 is a block diagram for illustrating the local memory bank of FIG. 12.

FIG. 13 is a block diagram for illustrating the local memory bank of FIG. 11 in detail.

Referring to FIG. 13, the local memory bank 122 may include a local memory bank controller 122_1 and a local memory bank cell array 122_2.

The local memory bank controller 122_1 may manage read and write operations via the addresses of data stored in the local memory bank 122. In other words, the local memory bank controller 122_1 may manage the input/output of data as a whole.

The local memory bank cell array 122_2 may be of a structure in which cells in which data is directly stored are arranged in rows and columns. The local memory bank cell array 122_2 may be controlled by the local memory bank controller 122_1.

Figure 14:
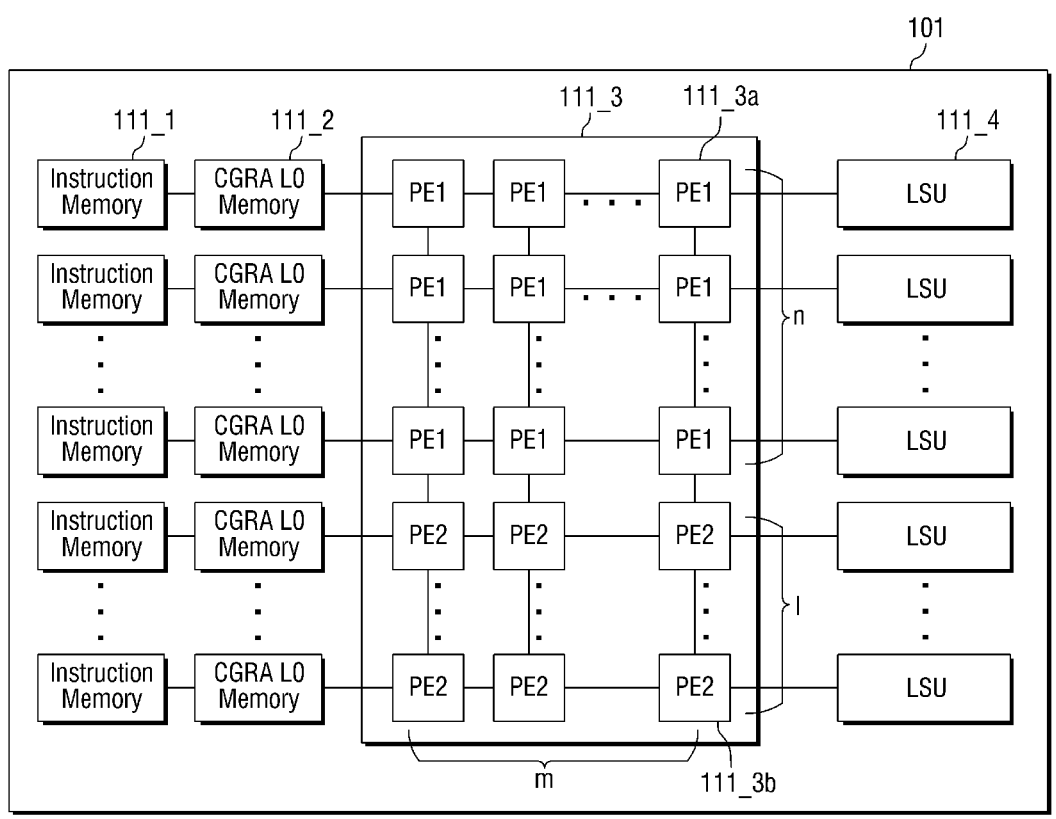
FIG. 14 is a block diagram for illustrating the structure of a neural processing device in accordance with some embodiments of the disclosure.

FIG. 14 is a block diagram for illustrating in detail the structure of the neural processing device in accordance with some embodiments of the disclosure.

Referring to FIG. 14, a neural core 101 may have a CGRA structure, unlike a neural core 100. The neural core 101 may include an instruction memory 111_1, a CGRA L0 memory 111_2, a PE array 111_3, and a load/store unit (LSU) 111_4. The PE array 111_3 may include a plurality of processing elements interconnected by a mesh style network. The mesh style network may be two-dimensional, three-dimensional, or higher-dimensional. In the CGRA, the plurality of processing elements may be reconfigurable or programmable. The interconnection between the plurality of processing elements may be reconfigurable or programmable. In some embodiments, the interconnection between the plurality of processing elements may be statically reconfigurable or programmable when the interconnection is fixed after the plurality of processing elements are configured or programed. In some embodiments, the interconnection between the plurality of processing elements may be dynamically reconfigurable or programmable when the interconnection is reconfigurable or programmable even after the plurality of processing elements are configured or programed.

The instruction memory 111_1 may receive and store instructions. The instruction memory 111_1 may sequentially store instructions internally, and provide the stored instructions to the PE array 111_3. In this case, the instructions may instruct the operation of first type of a plurality of processing elements 111_3a included in each PE array 111_3.

The CGRA L0 memory 111_2 may be located inside the neural core 101, receive all input data required for tasks of the neural core 101, and temporarily store the data. In addition, the CGRA L0 memory 111_2 may temporarily store output data calculated by the neural core 101 to transmit the data to the outside. The CGRA L0 memory 111_2 may serve as a cache memory of the neural core 101.

The CGRA L0 memory 111_2 may transmit and receive data to and from the PE array 111_3. The CGRA L0 memory 111_2 may correspond to L0 (a level 0) lower than L1. In this case, the L0 memory may be a private unshared memory of the neural core 101 unlike the L2 shared memory 400. The CGRA L0 memory 111_2 may transmit a program and data, such as activation or weight, to the PE array 111_3.

The PE array 111_3 may be a module that performs calculations. The PE array 111_3 may perform not only one-dimensional calculations but also two-dimensional or higher matrix/tensor calculations. The PE array 111_3 may include the first type of the plurality of processing elements 111_3a and a second type of a plurality of processing elements 111_3b therein.

The first type of the plurality of processing elements 111_3a and the second type of the plurality of processing elements 111_3b may be arranged in rows and columns. The first type of the plurality of processing elements 111_3a and the second type of the plurality of processing elements 111_3b may be arranged in m columns. In addition, the first type of the plurality of processing elements 111_3a may be arranged in n rows, and the second type of the plurality of processing elements 111_3b may be arranged in 1 rows. Accordingly, the first type of the plurality of processing elements 111_3a and the second type of the plurality of processing element 111_3b may be arranged in (n+l) rows and m columns.

The LSU 111_4 may receive at least one of data, a control signal, or a synchronization signal from the outside through the L2 sync path 300. The LSU 111_4 may transmit at least one of the received data, the received control signal, or the received synchronization signal to the CGRA L0 memory 111_2. Similarly, the LSU 111_4 may transmit at least one of data, a control signal, or a synchronization signal to the outside through the L2 sync path 300. The LSU 111_4 may be referred to as an LSU circuit, but for the sake of convenience, the terms are unified as an LSU. In addition, the LSU 111_4 may be implemented as a circuit or circuitry.

The neural core 101 may have a CGRA (Coarse Grained Reconfigurable Architecture) structure. Accordingly, in the neural core 101, each of the first type of the plurality of processing elements 111_3a and the second type of the plurality of processing elements 111_3b of the PE array 111_3 may be connected to at least one of the CGRA L0 memory 111_2, the instruction memory 111_1, or the LSU 111_4, respectively. In other words, the first type of the plurality of processing elements 111_3a and the second type of the plurality of processing elements 111_3b do not have to be connected to all of the CGRA L0 memory 111_2, the instruction memory 111_1, and the LSU 111_4, but may be connected to some thereof.

Further, the first type of the plurality of processing elements 111_3a and the second type of the plurality of processing elements 111_3b may be different types of processing elements from each other. Accordingly, out of the CGRA L0 memory 111_2, the instruction memory 111_1, and the LSU 111_4, the elements connected to the first type of the plurality of processing elements 111_3a and the elements connected to the second type of the plurality of processing elements 111_3b may be different from each other.

The neural core 101 of the disclosure having a CGRA structure enables high-level parallel calculations, and since direct data exchange between the first type of the plurality of processing elements 111_3a and the second type of the plurality of processing elements 111_3b is possible, the power consumption may be low. In addition, by including two or more types of processing elements, optimization according to various calculation tasks may also be possible.

For example, if the first type of the plurality of processing elements 111_3a are processing elements that perform two-dimensional calculations, the second type of the plurality of processing elements 111_3b may be processing elements that perform one-dimensional calculations. However, the embodiment is not limited thereto.

Figure 15:
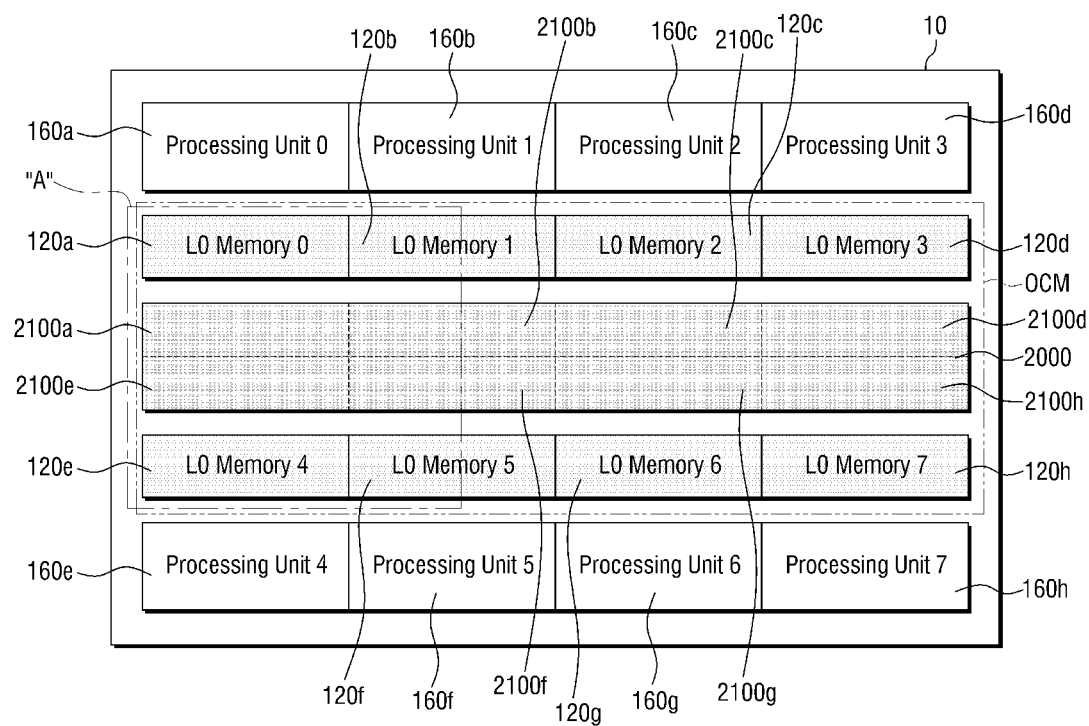
FIG. 15 is a block diagram for illustrating the memory reconstruction of the neural processing system in accordance with some embodiments of the disclosure.

FIG. 15 is a block diagram for illustrating memory reconfiguration of a neural processing system in accordance with some embodiments of the disclosure.

Referring to FIG. 15, the neural core SoC 10 may include first to eighth processing units 160a to 160h and an on-chip memory OCM. Although FIG. 15 illustrates eight processing units as an example, this is merely illustrative, and the number of processing units may vary as desired.

The on-chip memory OCM may include first to eighth L0 memories 120a to 120h and a shared memory 2000.

The first to eighth L0 memories 120a to 120h may be used as private memories for the first to eighth processing units 160a to 160h, respectively. In other words, the first to eighth processing units 160a to 160h and the first to eighth L0 memories 120a to 120h may correspond to each other 1:1.

The shared memory 2000 may include first to eighth memory units 2100a to 2100h. The first to eighth memory units 2100a to 2100h may correspond to the first to eighth processing units 160a to 160h and the first to eighth L0 memories 120a to 120h, respectively. That is, the number of memory units may be eight, which is the same as the number of processing units and L0 memories.

The shared memory 2000 may operate in one of two kinds of on-chip memory types. In other words, the shared memory 2000 may operate in one of a L0 memory type or a global memory type. In other words, the shared memory 2000 may implement two types of logical memories with one piece of hardware.

If the shared memory 2000 is implemented in the L0 memory type, the shared memory 2000 may operate as a private memory for each of the first to eighth processing units 160a to 160h, just like the first to eighth L0 memories 120a to 120h. The L0 memory can operate at a relatively higher clock speed compared with the global memory, and the shared memory 2000 may also use a relatively higher clock speed when operating in the L0 memory type.

If the shared memory 2000 is implemented in the global memory type, the shared memory 2000 may operate as a common memory used by the first processing unit 160a and the second processing unit 160b together. In this case, the shared memory 2000 may be shared not only by the first to eighth processing units 160a to 160h but also by the first to eighth L0 memories 120a to 120h.

The global memory may generally use a lower clock compared with the L0 memory, but is not limited thereto. When the shared memory 2000 operates in the global memory type, the first to eighth processing units 160a to 160h may share the shared memory 2000. In this case, the shared memory 2000 may be connected to the volatile memory 32 of FIG. 2 via the global interconnection 6000 and may also operate as a buffer for the volatile memory 32.

At least part of the shared memory 2000 may operate in the L0 memory type, and the rest may operate in the global memory type. In other words, the entire shared memory 2000 may operate in the L0 memory type, or the entire shared memory 2000 may operate in the global memory type. Alternatively, part of the shared memory 2000 may operate in the L0 memory type, and the rest may operate in the global memory type.

Figure 16:
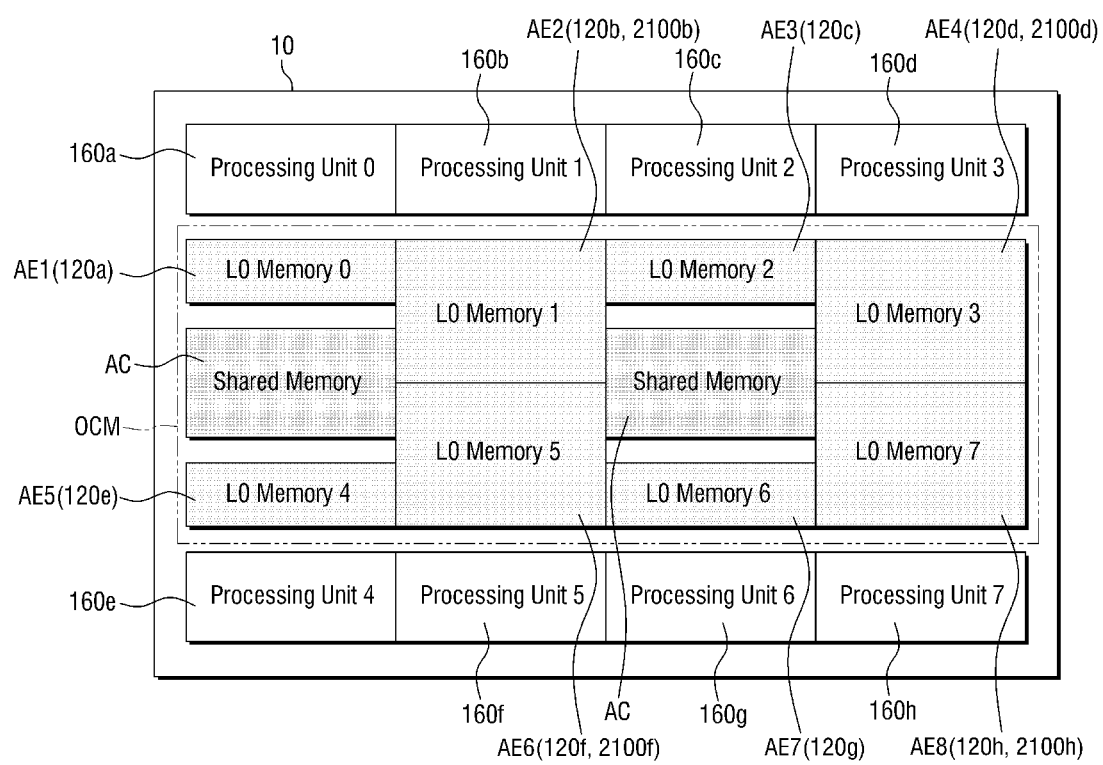
FIG. 16 is a block diagram showing an example of the memory reconstruction of the neural processing system in accordance with some embodiments of the disclosure.

FIG. 16 is a block diagram showing an example of memory reconstruction of a neural processing system in accordance with some embodiments of the disclosure.

With reference to FIGS. 15 and 16, first, third, fifth, and seventh dedicated areas AE1, AE3, AE5, and AE7 for each of the first, third, fifth, and seventh processing units 160a, 160c, 160e, and 160g may include only the first, third, fifth, and seventh L0 memories 120a, 120c, 120e, and 120g, respectively. Further, second, fourth, sixth, and eighth dedicated areas AE2, AE4, AE6, and AE8 for each of the second, fourth, sixth, and eighth processing units 160b, 160d, 160f, and 160h may include second, fourth, sixth, and eighth L0 memories 120b, 120d, 120f, and 120h, respectively. In addition, the second, fourth, sixth, and eighth dedicated areas AE2, AE4, AE6, and AE8 may include the second, fourth, sixth, and eighth memory units 2100b, 2100d, 2100f, and 2100h. The first, third, fifth, and seventh memory units 2100a, 2100c, 2100e, and 2100g of the shared memory 2000 may be used as a common area AC.

The common area AC may be a memory shared by the first to eighth processing units 160a to 160h. The second dedicated area AE2 may include a second L0 memory 120b and a second memory unit 2100b. The second dedicated area AE2 may be an area in which the second L0 memory 120b and the second memory unit 210b that are separated hardware-wise operate in the same manner and operate logically as one L0 memory. The fourth, sixth, and eighth dedicated areas AE4, AE6, and AE8 may also operate in the same manner as the second dedicated area AE2.

The shared memory 2000 in accordance with the embodiment may convert an area corresponding to each processing unit into a logical L0 memory and a logical global memory of an optimized ratio and may use them. The shared memory 2000 may perform the adjustment of this ratio at runtime.

That is, each processing unit may perform the same task in some cases, but may perform different tasks in other cases as well. In this case, the amount of the L0 memory and the amount of the global memory required for the tasks carried out by each processing unit are inevitably different each time. Accordingly, if the composition ratio of the L0 memory and the shared memory is fixedly set as in the conventional on-chip memory, there may occur inefficiency due to the calculation tasks assigned to each processing unit.

Therefore, the shared memory 2000 of the neural processing device in accordance with the embodiment may set an optimal ratio of the L0 memory and the global memory according to calculation tasks during the runtime, and may enhance the efficiency and speed of calculation.

Figure 17:
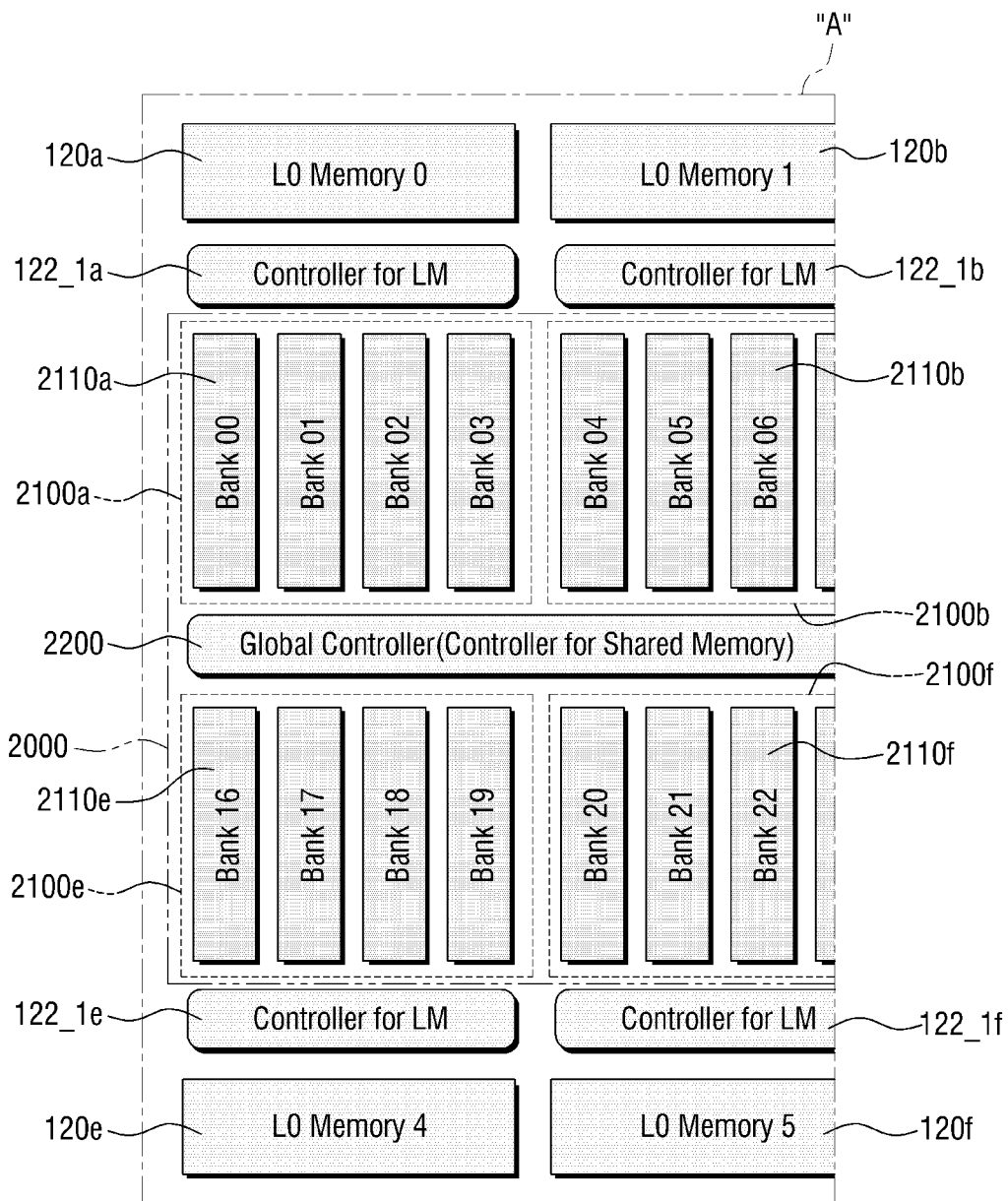
FIG. 17 is an enlarged block diagram of a portion A of FIG. 15.

FIG. 17 is an enlarged block diagram of a portion A of FIG. 14.

With reference to FIGS. 15 and 17, the shared memory 2000 may include a first L0 memory controller 122_1a, a second L0 memory controller 122_1b, a fifth L0 memory controller 122_1e, a sixth L0 memory controller 122_1f, the first to eighth memory units 2100a to 2100h, and a global controller 2200. Other L0 memory controllers not shown may also be included in the embodiment, but the description thereof will be omitted for convenience.

The first L0 memory controller 122_1a, the second L0 memory controller 122_1b, the fifth L0 memory controller 122_1e, the sixth L0 memory controller 122_1f, and the global controller 2200 may be referred to respectively as a first L0 memory controller circuit, a second L0 memory controller circuit, a fifth L0 memory controller circuit, a sixth L0 memory controller circuit, and a global controller circuit. However, for the sake of convenience, the terms are respectively unified as a first L0 memory controller, a second L0 memory controller, a fifth L0 memory controller, a sixth L0 memory controller, and a global controller. In addition, the first L0 memory controller 122_1a, the second L0 memory controller 122_1b, the fifth L0 memory controller 122_1e, the sixth L0 memory controller 122_1f, and the global controller 2200 may each be implemented as a circuit or circuitry.

The first L0 memory controller 122_1a may control the first L0 memory 120a. In addition, the first L0 memory controller 122_1a may control the first memory unit 2100a. Specifically, when the first memory unit 2100a is implemented in a logical L0 memory type, the control by the first L0 memory controller 122_1a may be performed on the first memory unit 2100a.

The second L0 memory controller 122_1b may control the second L0 memory 120b. Further, the second L0 memory controller 122_1b may control the second memory unit 2100b. In other words, when the second memory unit 2100b is implemented in the logical L0 memory type, the control by the first L0 memory controller 122_1a may be performed on the second memory unit 2100b.

The fifth L0 memory controller 122_1e may control the fifth L0 memory 120e. Further, the fifth L0 memory controller 122_1e may control the fifth memory unit 2100e. In other words, when the fifth memory unit 2100e is implemented in the logical L0 memory type, the control by the fifth L0 memory controller 122_1e may be performed on the fifth memory unit 2100e.

The sixth L0 memory controller 122_1f may control the sixth L0 memory 120f. Further, the sixth L0 memory controller 122_1f may control the sixth memory unit 2100f. In other words, when the sixth memory unit 2100f is implemented in the logical L0 memory type, the control by the sixth L0 memory controller 122_1f may be performed on the sixth memory unit 2100f.

The global controller 2200 may control all of the first to eighth memory units 2100a to 2100h. Specifically, the global controller 2200 may control the first memory unit 2100a to the eighth memory unit 2100h when the first to eighth memory units 2100a to 2100h each operate logically in the global memory type (i.e., when they do not operate logically in the L0 memory type).

In other words, the first to eighth memory units 2100a to 2100h may be controlled by the first to eighth L0 memory controllers 122_1a to 122_1h, respectively, or may be controlled by the global controller 2200, depending on what type of memory they are logically implemented.

If the L0 memory controllers including the first, second, fifth, and sixth L0 memory controllers 122_1a, 122_1b, 122_1e, and 122_1f control the first to eighth memory units 2100a to 2100h, respectively, the first to eighth L0 memory controllers 122_1a to 122_1h control the first to eighth memory units 2100a to 2100h in the same manner as the first to eighth L0 memories 120a to 120h, and thus, can control them as the private memory of the first to eighth processing units 160a to 160h. Accordingly, the first to eighth memory units 2100a to 2100h may operate at clock frequencies corresponding to the clock frequencies of the first to eighth processing units 160a to 160h.

The L0 memory controllers including the first L0 memory controller 122_1a, the second L0 memory controller 122_1b, the fifth L0 memory controller 122_1e, and the sixth L0 memory controller 122_1f may each include the LSU 110 of FIG. 9.

If the global controller 2200 controls at least one of the first to eighth memory units 2100a to 2100h, respectively, then the global controller 2200 may control the first to eighth memory units 2100a to 2100h as the global memory of the first to eighth processing units 160a to 160h, respectively. Accordingly, at least one of the first to eighth memory units 2100a to 2100h may operate at a clock frequency independent of the clock frequencies of the first to eighth processing units 160a to 160h, respectively. In some embodiments, if the global controller 2200 controls the i-th memory unit among the first to eighth memory units 2100a to 2100h, the global controller 2200 may control the i-th memory unit as the global memory of the i-th processing unit, and the i-th memory unit may operate at a clock frequency independent of the clock frequency of the i-th processing unit. However, the embodiment is not limited thereto.

The global controller 2200 may connect the first to eighth memory units 2100a to 2100h to the global interconnection 6000 of FIG. 5. The first to eighth memory units 2100a to 2100h may exchange data with the off-chip memory 30 of FIG. 2 by the control of the global controller 2200 or may respectively exchange data with the first to eighth L0 memories 120a to 120h.

Each of the first to eighth memory units 2100a to 2100h may include at least one memory bank. The first memory unit 2100a may include at least one first memory bank 2110a. The first memory banks 2110a may be areas obtained by dividing the first memory unit 2100a into certain sizes. The first memory banks 2110a may all be memory devices of the same size. However, the embodiment is not limited thereto. FIG. 17 illustrates that four memory banks are included in one memory unit.

Similarly, the second, fifth, and sixth memory units 2100b, 2100e, and 2100f may include at least one second, fifth, and sixth memory banks 2110b, 2110e, and 2110f, respectively.

In the following, the description will be made based on the first memory banks 2110a and the fifth memory banks 2110e, which may be the same as other memory banks including the second and sixth memory banks 2110b and 2110f.

The first memory banks 2110a may each operate logically in the L0 memory type or operate logically in the global memory type. In this case, the first memory banks 2110a may operate independently of the other memory banks in the first memory unit 2100a. However, the embodiment is not limited thereto.

If each memory bank operates independently, the first memory unit 2100a may include a first area operating in the same manner as the first L0 memory 120a and a second area operating in a different manner from the first L0 memory 120a. In this case, the first area and the second area do not necessarily coexist, but any one area may take up the entire first memory unit 2100a.

Likewise, the second memory unit 2100b may include a third area operating in the same manner as the second L0 memory 120b and a fourth area operating in a different manner from the second L0 memory 120b. In this case, the third area and the fourth area do not necessarily coexist, and any one area may take up the entire first memory unit 2100a.

In this case, the ratio of the first area to the second area may be different from the ratio of the third area to the fourth area. However, the embodiment is not limited thereto. Therefore, the ratio of the first area to the second area may be the same as the ratio of the third area to the fourth area. In other words, the memory composition ratio in each memory unit may vary as desired.

In this case, the ratio of the first area to the second area may be different from the ratio of the third area to the fourth area. However, the embodiment is not limited thereto. Therefore, the ratio of the first area to the second area may be the same as the ratio of the third area to the fourth area. In other words, the memory composition ratio in each memory unit may vary as desired.

On the other hand, the shared memory 2000 in accordance with some embodiments may be controlled selectively by any one of the two controllers depending on the cases. In this case, the shared memory 2000 may be controlled not only as a whole by a determined one of the two controllers but also independently for each memory unit or each memory bank.

Through this, the shared memory 2000 in accordance with the embodiment can obtain an optimal memory composition ratio according to calculation tasks during the runtime and can perform faster and more efficient calculation tasks. In the case of a processing unit specialized in artificial intelligence, the required sizes of L0 memory and global memory may vary for each particular application. Moreover, even for the same application, the required sizes of L0 memory and global memory may vary for each layer when a deep learning network is used. In the shared memory 2000 in accordance with the embodiment, the composition ratio of the memory can be changed during the runtime even when calculation steps change according to each layer, making fast and efficient deep learning tasks possible.

Figure 18:
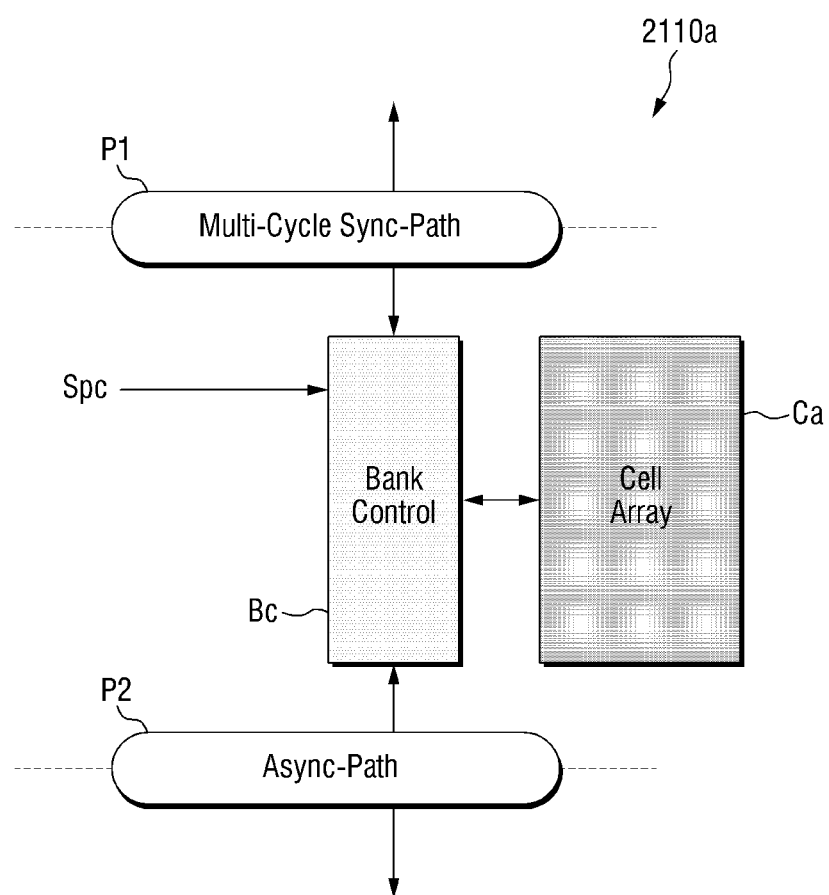
FIG. 18 is a diagram for illustrating the first memory bank of FIG. 17 in detail.

FIG. 18 is a diagram for illustrating the first memory bank of FIG. 17 in detail. Although FIG. 18 illustrates the first memory bank 2110a, other memory banks may also have the same structure as the first memory bank 2110a.

Referring to FIG. 18, the first memory bank 2110a may include a cell array Ca, a bank controller Bc, a first path unit P1, and a second path unit P2.

In this case, the bank controller Bc, the first path unit P1, and the second path unit P2 may be referred to respectively as a bank controller circuit, a first path unit circuit, and a second path unit circuit. However, for the sake of convenience, the terms are respectively unified as a bank controller, a first path unit, and a second path unit. In addition, the bank controller Bc, the first path unit P1, and the second path unit P2 may each be implemented as a circuit or circuitry.

The cell array Ca may include a plurality of memory devices (cells) therein. In the cell array Ca, the plurality of memory devices may be arranged in a lattice structure. The cell array Ca may be, for example, a SRAM (static random-access memory) cell array.

The bank controller Bc may control the cell array Ca. The bank controller Bc may determine whether the cell array Ca operates in the L0 memory type or in the global memory type, and may control the cell array Ca according to the determined memory type.

Specifically, the bank controller Bc may determine whether to transmit and receive data in the direction of the first path unit P1 or to transmit and receive data in the direction of the second path unit P2 during the runtime. The bank controller Bc may determine a data transmission and reception direction according to a path control signal Spc.

The path control signal Spc may be generated by a pre-designed device driver or compiler. The path control signal Spc may be generated according to the characteristics of calculation tasks. Alternatively, the path control signal Spc may be generated by an input received from a user. In other words, the user may directly apply an input to the path control signal Spc in order to select optimal memory composition ratio.

The bank controller Bc may determine a path along which the data stored in the cell array Ca are transmitted and received via the path control signal Spc. The exchange interface of data may be changed as the bank controller Bc determines the path along which the data are transmitted and received. In other words, a first interface may be used when the bank controller Bc exchanges data with the first path unit P1, and a second interface may be used when the bank controller Bc exchanges data with the second path unit P2. In this case, the first interface and the second interface may be different from each other.

Also, address systems in which data are stored may vary as well. In other words, if a particular interface is selected, then read and write operations may be performed in an address system corresponding thereto.

The bank controller Bc may operate at a particular clock frequency. For example, if the cell array Ca is an SRAM cell array, the bank controller Bc may operate at the operating clock frequency of a general SRAM.

The first path unit P1 may be connected to the bank controller Bc. The first path unit P1 may directly exchange the data of the cell array Ca with the first processing unit 160a. In this case, "directly" may mean being exchanged with each other without going through the global interconnection 6000. In other words, the first processing unit 160a may exchange data directly with the first L0 memory 120a, and the first processing unit 160a may exchange data via the first path unit P1 when the shared memory 2000 is implemented logically in the L0 memory type. The first path unit P1 may include L0 memory controllers including the first L0 memory controller 122_1a and the second L0 memory controller 122_1b as shown in FIG. 17.

The first path unit P1 may form a multi-cycle sync-path. In other words, the operating clock frequency of the first path unit P1 may be the same as the operating clock frequency of the first processing unit 160a. The first L0 memory 120a may quickly exchange data at the same clock frequency as the operating clock frequency of the first processing unit 160a in order to quickly exchange data at the same speed as the operation of the first processing unit 160a. Likewise, the first path unit P1 may also operate at the same clock frequency as the operating clock frequency of the first processing unit 160a.

In this case, the operating clock frequency of the first path unit P1 may be multiples of the operating clock frequency of the bank controller Bc. In this case, a clock domain crossing (CDC) operation for synchronizing the clocks between the bank controller Bc and the first path unit P1 is not needed separately, and thus, a delay of data transmission may not occur. Accordingly, faster and more efficient data exchange can be possible.

In FIG. 18, the operating clock frequency of the first path unit P1 may be 1.5 GHz, as an example. This may be twice the frequency of 750 MHz of the bank controller Bc. However, the embodiment is not limited thereto, and any may be possible as long as the first path unit P1 operates at integer multiples of the clock frequency of the bank controller Bc.

The second path unit P2 may be connected to the bank controller Bc. The second path unit P2 may exchange the data of the cell array Ca with the first processing unit 160a not directly but via the global interconnection 6000. In other words, the first processing unit 160a may exchange data with the cell array Ca via the global interconnection 6000 and the second path unit P2. In this case, the cell array Ca may exchange data not only with the first processing unit 160a but also with other processing units.

In other words, the second path unit P2 may be a data exchange path between the cell array Ca and all the processing units when the first memory bank 2110a is implemented logically in the global memory type. The second path unit P2 may include the global controller 2200 of FIG. 17.

The second path unit P2 may form an Async-Path. The operating clock frequency of the second path unit P2 may be the same as the operating clock frequency of the global interconnection 6000. Likewise, the second path unit P2 may also operate at the same clock frequency as the operating clock frequency of the global interconnection 6000.

In this case, the operating clock frequency of the second path unit P2 may not be synchronized with the operating clock frequency of the bank controller Bc. In this case, the clock domain crossing (CDC) operation for synchronizing the clocks between the bank controller Bc and the second path unit P2 may be required. If the operating clock frequency of the bank controller Bc and the operating clock frequency of the second path unit P2 are not synchronized with each other, the degree of freedom in the design of the clock domain may be relatively high. Therefore, the difficulty of hardware design is decreased, thereby making it possible to more easily derive the hardware operation.

The bank controller Bc may use different address systems in the case of exchanging data via the first path unit P1 and in the case of exchanging data via the second path unit P2. In other words, the bank controller Bc may use a first address system if via the first path unit P1 and a second address system if via the second path unit P2. In this case, the first address system and the second address system may be different from each other.

The bank controller Bc does not necessarily have to exist for each memory bank. In other words, the bank controller Bc is not a part for scheduling but serves to transfer signals, and thus, is not an essential part for each memory bank having two ports. Therefore, one bank controller Bc can control multiple memory banks. The multiple memory banks may operate independently even if they are controlled by the bank controller Bc. However, the embodiment is not limited thereto.

As a matter of course, the bank controller Bc may exist for each memory bank. In this case, the bank controller Bc may control each memory bank individually.

Referring to FIG. 17 and FIG. 18, if the first memory unit 2100a exchanges data via the first path unit P1, the first address system may be used. If the first memory unit 2100a exchanges data via the second path unit P2, the second address system may be used. Similarly, if the second memory unit 2100b exchanges data via the first path unit P1, a third address system may be used. If the second memory unit 2100b exchanges data via the second path unit P2, the second address system may be used. In this case, the first address system and the third address system may be the same as each other. However, the embodiment is not limited thereto.

The first address system and the third address system may each be used exclusively for the first processing unit 160a and the second processing unit 160b, respectively. The second address system may be commonly applied to the first processing unit 160a and the second processing unit 160b.

In FIG. 18, the operating clock frequency of the second path unit P2 may operate at 1 GHz, as an example. This may be a frequency that is not synchronized with the operating clock frequency of 750 MHz of the bank controller Bc. In other words, the operating clock frequency of the second path unit P2 may be freely set without being dependent on the operating clock frequency of the bank controller Bc at all.

A generic global memory has used slow SRAM (e.g., 750 MHz) and a global interconnection (e.g., 1 GHz) faster than that, inevitably resulting in delays due to the CDC operation. On the other hand, the shared memory 2000 in accordance with some embodiments has room to use the first path unit P1 in addition to the second path unit P2, thereby making it possible to avoid delays resulting from the CDC operation.

Furthermore, in the generic global memory, a plurality of processing units use one global interconnection 6000, and thus, when the amount of data transfer occurs at the same time, the decrease in the overall processing speed is likely to occur. On the other hand, the shared memory 2000 in accordance with some embodiments has room to use the first path unit P1 in addition to the second path unit P2, thereby making it possible to achieve the effect of properly distributing the data throughput that could be concentrated on the global controller 2200 as well.

Figure 19:
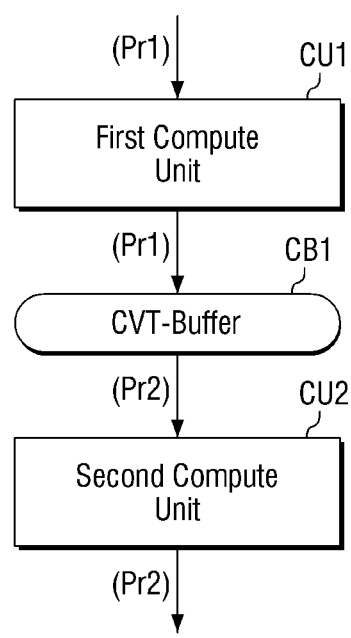
FIG. 19 is a block diagram illustrating conversion of a neural processing device according to some embodiments of the disclosure.

FIG. 19 is a block diagram illustrating conversion of a neural processing device according to some embodiments of the disclosure.

Referring to FIG. 19, the neural processing device according to some embodiments of the disclosure may include a first compute unit CU1, a first converting buffer CB1, and a second compute unit CU2. In this case, the first compute unit CU1 and the second compute unit CU2 may be the same compute device as the PE array 163 and the vector unit 164 of FIG. 11. Alternatively, the first compute unit CU1 may be implemented by the first type of the plurality of processing elements 111_3a of FIG. 14. The second compute unit CU2 may be implemented by the second type of the plurality of processing elements 111_3b of FIG. 14. However, the embodiment is not limited thereto.

The first compute unit CU1 may receive first input data in first precision Pr1. In this case, the first precision Pr1 may include an integer type such as int2, int4 or int8, a fixed-point type, or a floating point type such as fp16, fp32 or fp64. However, the embodiment is not limited thereto, and the first precision Pr1 may also include a variety of modified types.

The first compute unit CU1 may output first output data in the first precision Pr1 through calculations. In this case, the first precision Pr1 of first input data and the first precision Pr1 of the first output data may be the same precision having the same number of bits, but may be the same precision having only the same form of different number of bits. That is, for example, the first input data may be int8, and the first output data may be int24. This is because a result of calculation may be a value overflowed from the existing form.

The second compute unit CU2 may receive second input data in second precision Pr2. In this case, the second precision Pr2 may include at least one of an integer type such as int2, int4 or int8, a fixed-point type, or a floating-point type such as fp16, fp32, or fp64. However, the embodiment is not limited thereto, and the second precision Pr2 may also include a variety of modified types. The second precision Pr2 may be different from the first precision Pr1.

The second compute unit CU2 may output second output data in the second precision Pr2 through calculation. In this case, the second precision Pr2 of the second input data and the second precision Pr2 of the second output data may be the same precision having the same number of bits, but may be the same precision having only the same form of different number of bits.

That is, the first compute unit CU1 and the second compute unit CU2 may be compute units that perform calculations in different precision. There are a variety of compute units in the neural processing device, and the compute units may perform calculations in different precision for a variety of reasons. Accordingly, in order to associate an input value with an output value, a process of converting the precision may be required.

A known calculation device may include a logic module that converts precision by using a compute unit therein. Accordingly, when the input data is inputted to the compute unit, the precision may be converted, and calculation may be performed.

The compute units of the neural processing device may have very large scale, and accordingly, resources, such as supply power, used by each compute unit may be the most important. Therefore, depending on scales of compute units, resources consumed by a logic module performing the precision may be very large, which may act as a factor in reducing efficiency of the entire device.

Accordingly, the embodiment may perform precision conversion outside the compute units. The first converting buffer CB1 may receive the first output data in the first precision Pr1 from the first compute unit CU1. The first converting buffer CB1 may convert the first output data in the first precision Pr1 to the second input data in the second precision Pr2 and transmit the converted second input data to the second compute unit CU2.

The first converting buffer CB1 may transmit data between the first compute unit CU1 and the second compute unit CU2. That is, in order for the first compute unit CU1 and the second compute unit CU2 to transmit and receive data to and from each other, it is necessary to prepare data for reception and transmission, and after the preparation is completed, data may be received or transmitted according to clock timing. In general, data transmission between two compute units, such as the first compute unit CU1 and the second compute unit CU2, may be performed through a buffer memory.

This is to adjust an interval between output timing of the first compute unit CU1 and input timing of the second compute unit CU2. Accordingly, a buffer memory may be required in general, and there may be no performance constraint or resource loss due to the buffer memory. Accordingly, the embodiment may also perform precision conversion of data in transmission without performance constraint or resource loss by adding a conversion logic to precision to an essential buffer memory.

Figure 20:
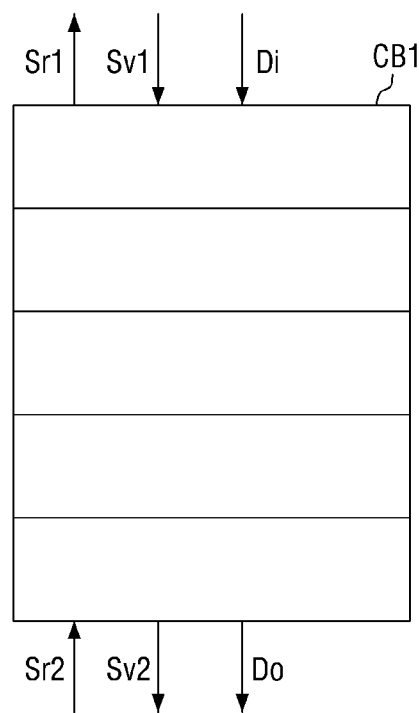
FIG. 20 is a block diagram illustrating a handshaking operation of the first converting buffer of FIG. 19.

FIG. 20 is a block diagram illustrating a handshaking operation of the first converting buffer of FIG. 19.

Referring to FIGS. 19 and 20, the first converting buffer CB1 may transmit a first ready signal Sr1 to the first compute unit CU1. In addition, the first converting buffer CB1 may receive a first valid signal Sv1 from the first compute unit CU1. In this case, an order of transmission of the first ready signal Sr1 and reception of the first valid signal Sv1 may be changed. Likewise, when both the first ready signal Sr1 and the first valid signal Sv1 are all transmitted and received, the first compute unit CU1 may transmit input data Di to the first converting buffer CB1. The input data Di may be transmitted from the first compute unit CU1 to the first converting buffer CB1.

Similarly, the first converting buffer CB1 may transmit a second valid signal Sv2 to the second compute unit CU2. In addition, the first converting buffer CB1 may receive a second ready signal Sr2 from the second compute unit CU2. In this case, an order of reception of the second ready signal Sr2 and transmission of the second valid signal Sv2 may be changed. Likewise, when both the second ready signal Sr2 and the second valid signal Sv2 are all received and transmitted, the first converting buffer CB1 may transmit output data Do to the second compute unit CU2. The output data Do may be transmitted from the first converting buffer CB1 to the second compute unit CU2.

Figure 21:
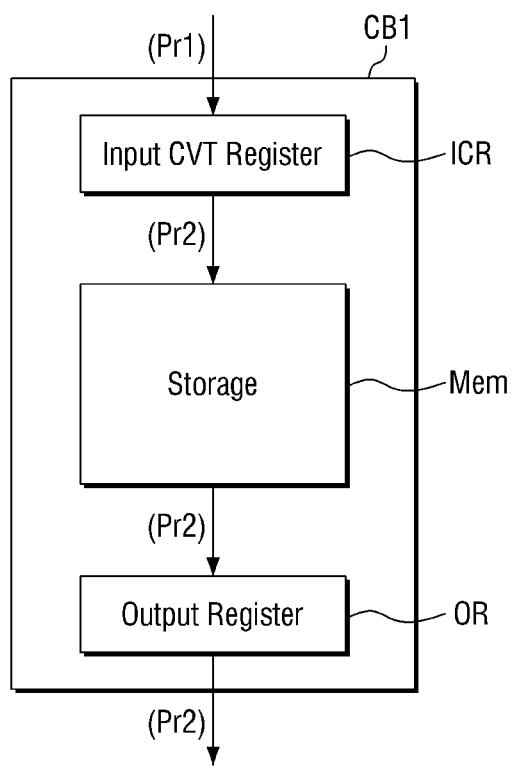
FIG. 21 is a block diagram specifically illustrating structure of the first converting buffer of FIG. 19.

FIG. 21 is a block diagram specifically illustrating a structure of the first converting buffer of FIG. 19.

Referring to FIG. 21, the first converting buffer CB1 may include an input converting register ICR, a storage Mem and an output register OR.

The input converting register ICR may receive first output data in the first precision Pr1. The input converting register ICR may convert the first output data into the second precision Pr2. The first output data may be converted into the second precision Pr2 and may become second input data. That is, the second input data and the first output data may be the same data with different precision.

The input converting register ICR may serve to transmit data to a next clock edge by temporarily receiving the data before storing the data in the storage Mem. Accordingly, time for conversion may not be greatly added, and even conversion may be performed at the original latching time, and thus, efficiency of data conversion may be greatly increased.

The storage Mem may receive the converted second input data from the input converting register ICR and store therein. The storage Mem may temporarily store the second input data until the second input data is transmitted to the second compute unit CU2. In this case, the second input data may be in the second precision Pr2.

The output register OR may receive the second input data in the second precision Pr2 from the storage Mem and transmit the second input data to the second compute unit CU2. The output register OR may also serve to temporarily receive the data before transmitting the data to the second compute unit CU2, and to transmit the data to a next clock edge.

In the embodiment, a converting logic may be added to the input converting register ICR. When bits of the data are reduced due to conversion, degree of precision of hardware may be reduced. Accordingly, hardware after the input converting register ICR may be implemented with lower degree of precision, and thus, design difficulty of hardware may be reduced and complexity of hardware may be reduced.

Figure 22:
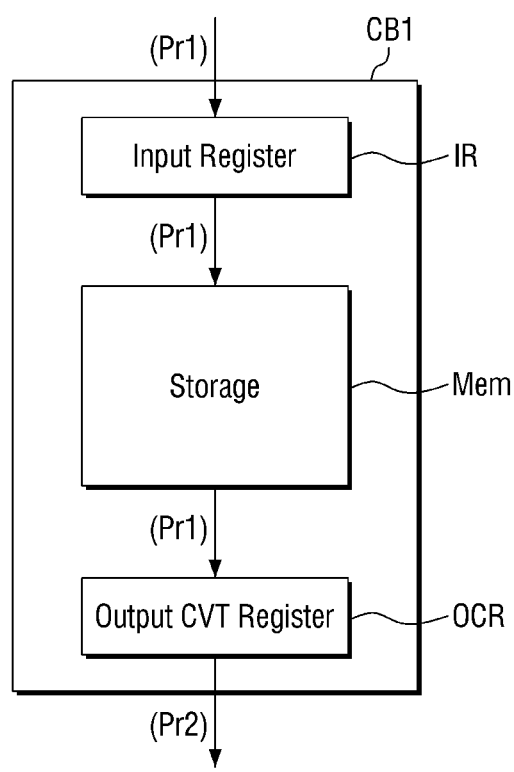
FIG. 22 is a block diagram illustrating a first converting buffer of a neural processing device according to some embodiments of the disclosure.

FIG. 22 is a block diagram illustrating the first converting buffer of the neural processing device according to some embodiments of the disclosure.

Referring to FIG. 22, the first converting buffer CB1 may include an input register IR, a storage Mem, and an output converting register OCR.

The input register IR may receive first output data in the first precision Pr1. The input register IR may serve to temporarily receive data before storing the data in the storage Mem, and to transmit the data to a next clock edge.

The storage Mem may receive first output data from the input register IR and store the first output data. The storage Mem may temporarily store the second input data until the second input data is transmitted to the second compute unit CU2. In this case, the first output data may be in the first precision Pr1.

The output converting register OCR may receive the first output data in the first precision Pr1 from the storage Mem and convert the first output data into the second precision Pr2. The output converting register OCR may transmit the first output data to the second compute unit CU2. The output converting register OCR may also serve to temporarily receive data before transmitting the data to the second compute unit CU2 and to transmit the data to the next clock edge. Accordingly, conversion may also be performed at the original latching time without greatly adding time for conversion, and thus, efficiency of data conversion may be greatly increased.

In the embodiment, a converting logic may be added to the output converting register OCR. When bits of data are increased due to conversion, degree of precision of hardware may be reduced by providing the converting logic on an output side instead of an input side. Accordingly, hardware before the output converting register OCR may be implemented with lower degree of precision, and thus, design difficulty of hardware may be reduced and complexity of hardware may be reduced.

Figure 23:
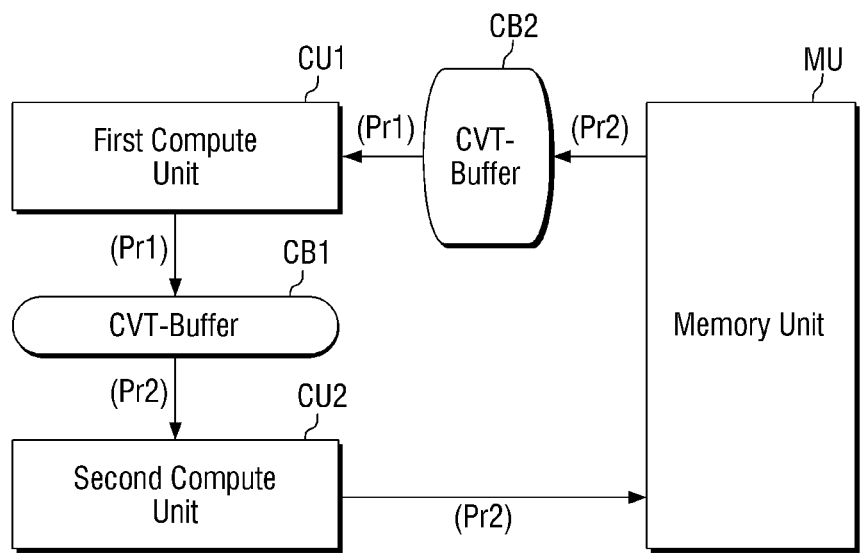
FIG. 23 is a block diagram illustrating a neural processing device according to some embodiments of the disclosure.

FIG. 23 is a block diagram illustrating a neural processing device according to some embodiments of the disclosure.

Referring to FIG. 23, the neural processing device according to some embodiments of the disclosure may further include a second converting buffer CB2 and a memory unit MU.

The memory unit MU may be the L0 memory 120 of FIG. 9 described above and the CGRA L0 memory 111_2 of FIG. 14, but the embodiment is not limited thereto. The memory unit MU may receive second output data in the second precision Pr2 from the second compute unit CU2 and store the second output data.

The memory unit MU may provide the stored second output data to the second converting buffer CB2 as first input data. That is, the second converting buffer CB2 may receive the first input data in the second precision Pr2 from the memory unit MU. The second converting buffer CB2 may convert the first input data in the second precision Pr2 into the first precision Pr1.

When the second precision Pr2 is more precise than the first precision Pr1, for example, when the second precision Pr2 is fp16 and the first precision Pr1 is int8, int24, the embodiment may store more accurate data in the memory unit MU to increase accuracy in other calculation.

Figure 24:
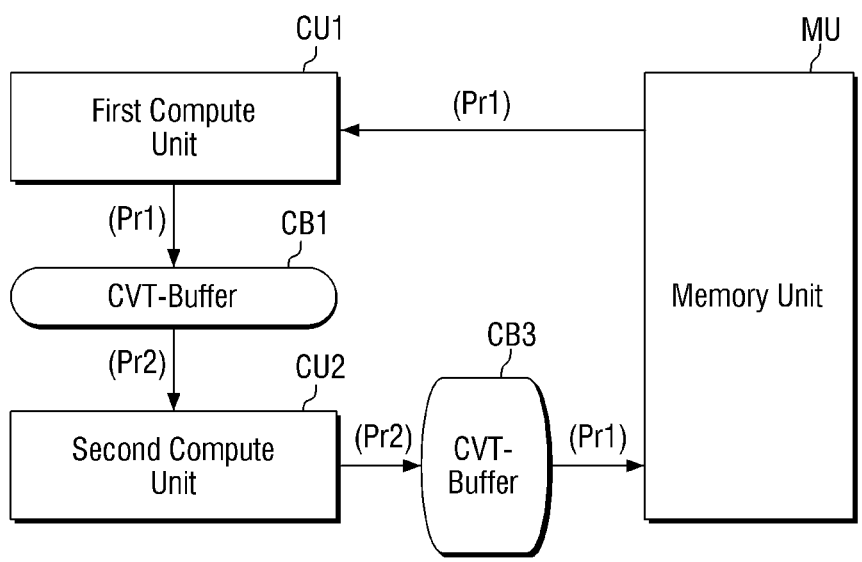
FIG. 24 is a block diagram illustrating a neural processing device according to some embodiments of the disclosure.

FIG. 24 is a block diagram illustrating a neural processing device according to some embodiments of the disclosure.

Referring to FIG. 24, the neural processing device according to some embodiments of the disclosure may further include a third converting buffer CB3.

The third converting buffer CB3 may receive second output data in the second precision Pr2 from the second compute unit CU2, convert the second output data into the first precision Pr1, and store the second output data in the memory unit MU. In this case, the memory unit MU may transmit data directly to the first compute unit CU1 without any conversion.

When the second precision Pr2 is more precise than the first precision Pr1, for example, when the second precision Pr2 is fp16 and the first precision Pr1 is int8 or int24, the embodiment may store data having the lower bit in a memory and transmit the data, and thus, memory efficiency may be maximized and hardware constraint may be reduced.

Figure 25:
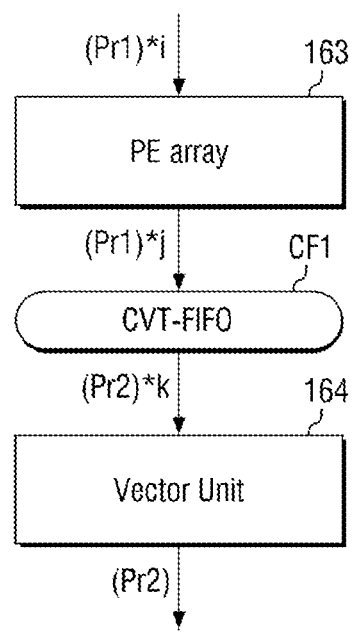
FIG. 25 is a block diagram illustrating a neural processing device according to some embodiments of the disclosure.

FIG. 25 is a block diagram illustrating a neural processing device according to some embodiments of the disclosure.

Referring to FIG. 25, a first computing unit may be the PE array 163 of FIG. 11, and a second computing unit may be the vector unit 164 of FIG. 11. In addition, a first converting buffer may be a first converting first in first out (FIFO) buffer CF1.

The PE array 163 may receive i pieces of first input data of the first precision Pr1. The PE array 163 may perform two-dimensional calculations and may receive a plurality of input data. The PE array 163 may set, for example, int8 as precision of the input data. The PE array 163 may perform two-dimensional calculations and output j pieces of first output data in the first precision Pr1. In this case, j may be different from i. However, the embodiment is not limited thereto.

The first converting FIFO buffer CF1 may perform buffering in form of FIFO. The FIFO may have a first in first out structure in which first input data is outputted firstly. Accordingly, the FIFO is a general buffer memory form of data transmission.

However, the first converting FIFO buffer CF1 may perform internal processing, and accordingly, the number of input data may be different from the number of output data. That is, the first converting FIFO buffer CF1 may receive j pieces of first output data and output k pieces of second input data. In this case, i and k may be the same as or different from each other.

The vector unit 164 may receive k pieces of second input data in the second precision Pr2 and sum the k pieces of second input data by one-dimensional calculations. Accordingly, the vector unit 164 may output one piece of second output data in the second precision Pr2.

Figure 26:
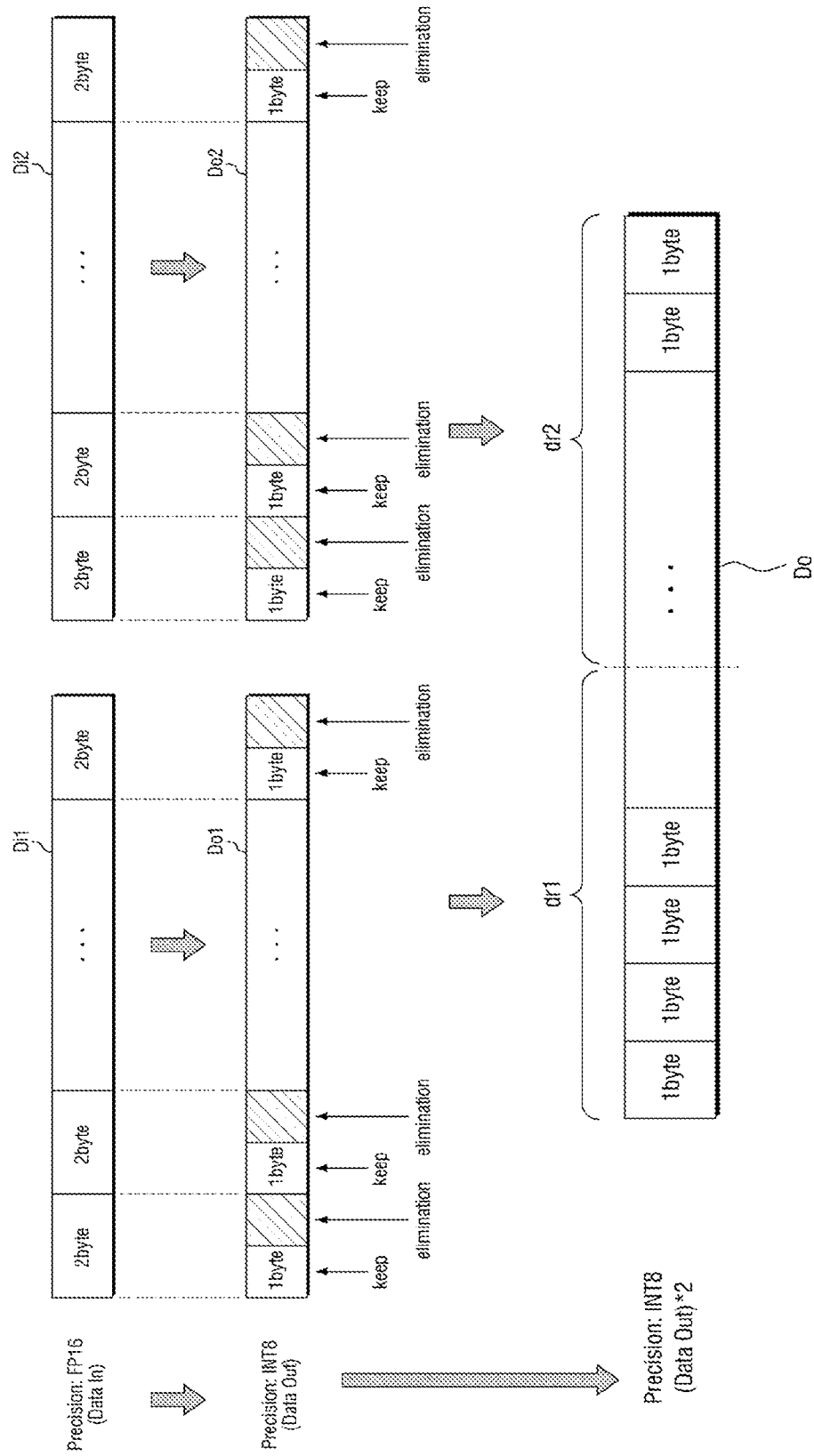
FIG. 26 is a conceptual diagram illustrating an operation of a first converting first in first out (FIFO) buffer of FIG. 25.

FIG. 26 is a conceptual diagram illustrating an operation of the first converting FIFO buffer CF1 of FIG. 25.

Referring to FIG. 26, the first converting FIFO buffer CF1 may receive first input data Di1 and second input data Di2 and output output data Do. In this case, when the first precision Pr1 of the first input data Di1 and the first precision Pr1 of the second input data Di2 is fp16 and the second precision Pr2 of the output data Do is int8, data of different sizes may be output.

The first converting FIFO buffer CF1 may generate first output data Do1 by converting the first input data Di1 into the second precision Pr2. The first converting FIFO buffer CF1 may generate second output data Do2 by converting the second input data Di2 into the second precision Pr2.

In this case, the first input data Di1 and the second input data Di2 may be composed of multiple pieces of data, each having a size of 16 bits, that is, 2 bytes. The first output data Do1 and the second output data Do2 may be composed of multiple pieces of data, each having a size of 8 bits, that is, 1 byte. That is, the total number of bits may be reduced to half.

Accordingly, the first converting FIFO buffer CF1 may generate the output data Do by merging both the first output data Do1 and the second output data Do2. In this case, the output data Do may include a plurality of pieces of data of 8 bits, or 1 byte.

However, one output data Do may correspond to two input data, and thus, the number of data may be reduced to half. In this way, in the first converting FIFO buffer CF1, the number of input data may be different from the number of output data. This may be due to when there is an integer-multiple difference between input precision and output precision. In this way, according to the embodiment, faster and more efficient data transmission may be performed.

In addition, the first converting FIFO buffer CF1 may control the number of output data according to size of an input data of compute module which receives data later, even when there is no data merging described above. According to these many factors, the number of input data and the number of output data of the first converting FIFO buffer CF1 may be different from each other.

Figure 27:
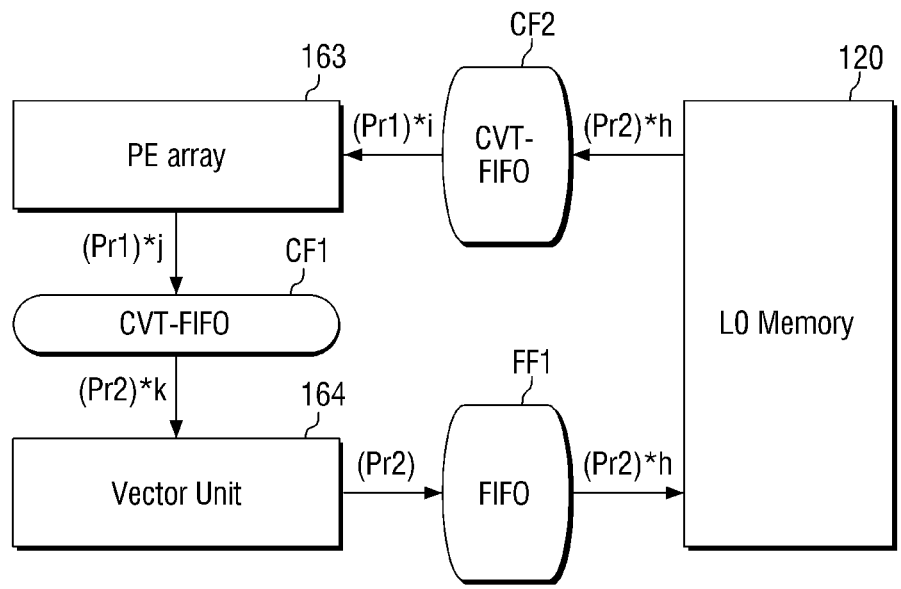
FIG. 27 is a block diagram illustrating a neural processing device according to some embodiments of the disclosure.

FIG. 27 is a block diagram illustrating a neural processing device according to some embodiments of the disclosure.

Referring to FIG. 27, the neural processing device according to some embodiments of the disclosure may further include a first FIFO buffer FF1, an L0 memory 120, and a second converting FIFO buffer CF2.

The first FIFO buffer FF1 may receive second output data in the second precision Pr2 and transmit the second output data to the L0 memory 120 without conversion. In this case, according to the number of data that may be inputted to the L0 memory 120, the first FIFO buffer FF1 may transmit h pieces of second output data.

The L0 memory 120 may provide first input data in the second precision Pr2 to the second converting FIFO buffer CF2 after receiving the h pieces of second output data.

The second converting FIFO buffer CF2 may convert h pieces of first input data in the second precision Pr2 into the first precision Pr1 and provide i pieces of data according to the number of data that may be inputted to the PE array 163.

In the embodiment, when the second precision Pr2 is more precise than the first precision Pr1, the more precise data may be stored in the L0 memory 120 to increase accuracy of calculations when the data is used for another calculation later.

Figure 28:
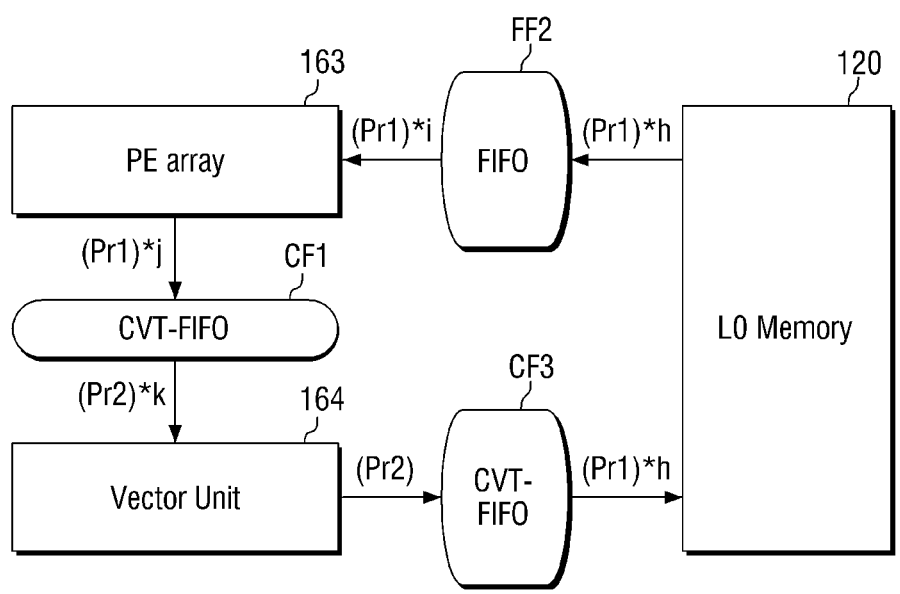
FIG. 28 is a block diagram illustrating a neural processing device according to some embodiments of the disclosure.

FIG. 28 is a block diagram illustrating a neural processing device according to some embodiments of the disclosure.

Referring to FIG. 28, the neural processing device according to some embodiments of the disclosure may further include a second FIFO buffer FF2 and a third converting FIFO buffer CF3.

The third converting FIFO buffer CF3 may receive second output data in the second precision Pr2 and convert the second output data into the first precision Pr1. The third converting FIFO buffer CF3 may transmit the second output data to the L0 memory 120. In this case, according to the number of data that may be inputted to the L0 memory 120, the third converting FIFO buffer CF3 may transmit h pieces of second output data.

The L0 memory 120 may provide h pieces of first input data in the second precision Pr2 to the second FIFO buffer FF2 after receiving the h pieces of second output data.

The second FIFO buffer FF2 may provide the h pieces of first input data in the first precision Pr1 as i pieces of data according to the number of data that may be inputted to the PE array 163.

According to the embodiment, when the second precision Pr2 is more precise than the first precision Pr1, data may be stored in the L0 memory 120 in the first precision Pr1 state with lower degree of precision, and thus, hardware efficiency may be maximized. That is, data may be stored with less bits, and thus, storage efficiency may be increased, and resources of a transmission structure may not be greatly required.

Figure 29:
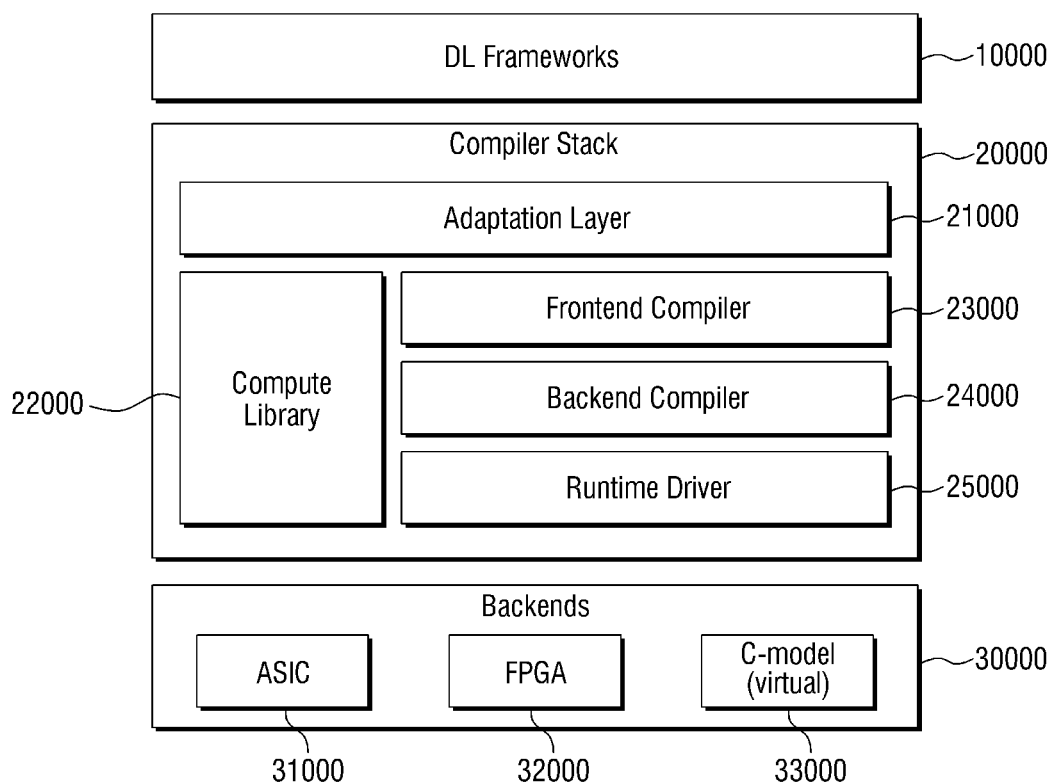
FIG. 29 is a block diagram for illustrating a software hierarchy of a neural processing device in accordance with some embodiments of the disclosure.

FIG. 29 is a block diagram for illustrating a software hierarchy of a neural processing device in accordance with some embodiments of the disclosure.

Referring to FIG. 29, the software hierarchy of the neural processing device in accordance with some embodiments may include a deep learning (DL) framework 10000, a compiler stack 20000, and a back-end module 30000.

The DL framework 10000 may mean a framework for a deep learning model network used by a user. For example, a neural network that has finished training may be generated using a program such as TensorFlow or PyTorch.

The compiler stack 20000 may include an adaptation layer 21000, a compute library 22000, a front-end compiler 23000, a back-end compiler 24000, and a runtime driver 25000.

The adaptation layer 21000 may be a layer in contact with the DL framework 10000. The adaptation layer 21000 may quantize a neural network model of a user generated by the DL framework 10000 and modify graphs. In addition, the adaptation layer 21000 may convert the type of model into a required type.

The front-end compiler 23000 may convert various neural network models and graphs transferred from the adaptation layer 21000 into a constant intermediate representation (IR). The converted IR may be a preset representation that is easy to handle later by the back-end compiler 24000.

The optimization that can be done in advance in the graph level may be performed on such an IR of the front-end compiler 23000. In addition, the front-end compiler 23000 may finally generate the IR through the task of converting it into a layout optimized for hardware.

The back-end compiler 24000 optimizes the IR converted by the front-end compiler 23000 and converts it into a binary file, enabling it to be used by the runtime driver. The back-end compiler 24000 may generate an optimized code by dividing a job at a scale that fits the details of hardware.

The compute library 22000 may store template operations designed in a form suitable for hardware among various operations. The compute library 22000 provides the back-end compiler 24000 with multiple template operations required by hardware, allowing the optimized code to be generated.

The runtime driver 25000 may continuously perform monitoring during driving, thereby making it possible to drive the neural network device in accordance with some embodiments. Specifically, it may be responsible for the execution of an interface of the neural network device.

The back-end module 30000 may include an ASIC (application-specific integrated circuit) 31000, an FPGA (field-programmable gate array) 32000, and a C-model 33000. The ASIC 31000 may refer to a hardware chip determined according to a predetermined design method. The FPGA 32000 may be a programmable hardware chip. The C-model 33000 may refer to a model implemented by simulating hardware on software.

The back-end module 30000 may perform various tasks and derive results by using the binary code generated through the compiler stack 20000.

Figure 30:
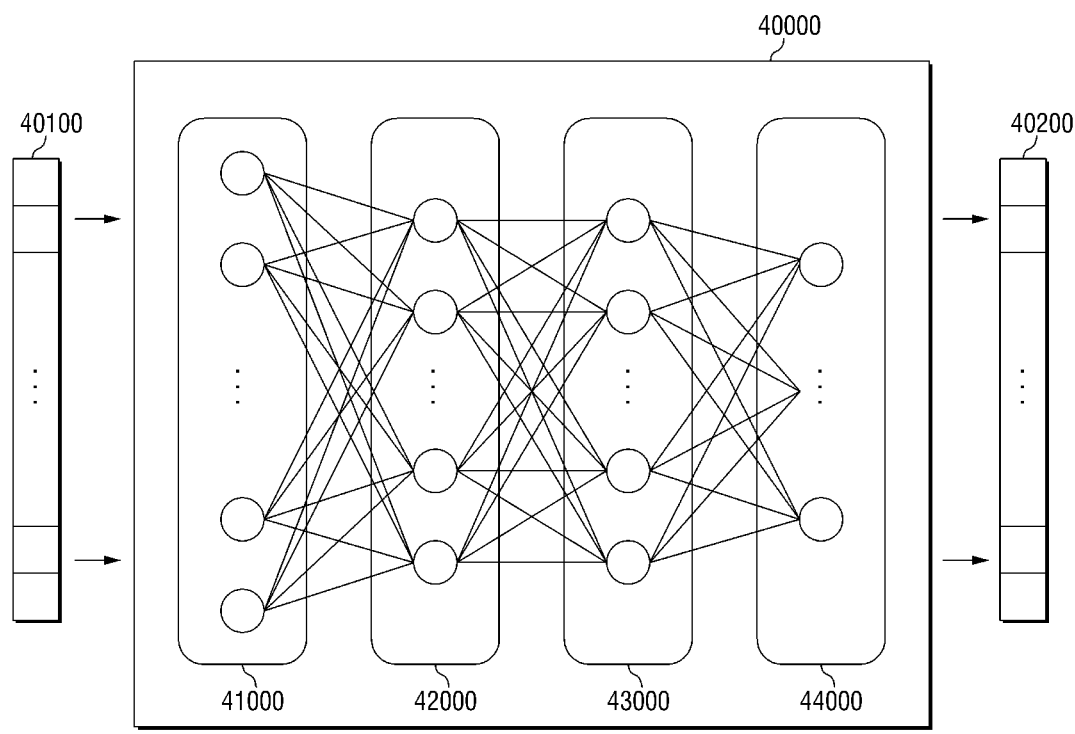
FIG. 30 is a conceptual diagram for illustrating deep learning calculations performed by a neural processing device in accordance with some embodiments of the disclosure.

FIG. 30 is a conceptual diagram for illustrating deep learning calculations performed by a neural processing device in accordance with some embodiments of the disclosure.

Referring to FIG. 30, an artificial neural network model 40000 is one example of a machine learning model, and is a statistical learning algorithm implemented based on the structure of a biological neural network or is a structure for executing the algorithm, in machine learning technology and cognitive science.

The artificial neural network model 40000 may represent a machine learning model having an ability to solve problems by learning to reduce the error between an accurate output corresponding to a particular input and an inferred output by repeatedly adjusting the weight of the synapse by nodes, which are artificial neurons that have formed a network by combining synapses, as in a biological neural network. For example, the artificial neural network model 40000 may include any probabilistic model, neural network model, etc., used in artificial intelligence learning methods such as machine learning and deep learning.

A neural processing device in accordance with some embodiments may implement the form of such an artificial neural network model 40000 and perform calculations. For example, the artificial neural network model 40000 may receive an input image, and may output information on at least a part of an object included in the input image.

The artificial neural network model 40000 may be implemented by a multilayer perceptron (MLP) including multi-layer nodes and connections between them. An artificial neural network model 40000 in accordance with the embodiment may be implemented using one of various artificial neural network model structures including the MLP. As shown in FIG. 29, the artificial neural network model 40000 includes an input layer 41000 that receives input signals or data 40100 from the outside, an output layer 44000 that outputs output signals or data 40200 corresponding to the input data, and n (where n is a positive integer) hidden layers 42000 to 43000 that are located between the input layer 41000 and the output layer 44000 and that receive a signal from the input layer 41000, extract characteristics, and forward them to the output layer 44000. Here, the output layer 44000 receives signals from the hidden layers 42000 to 43000 and outputs them to the outside.

The learning methods of the artificial neural network model 40000 include a supervised learning method for training to be optimized to solve a problem by the input of supervisory signals (correct answers), and an unsupervised learning method that does not require supervisory signals.

The neural processing device may directly generate training data, through simulations, for training the artificial neural network model 40000. In this way, by matching a plurality of input variables and a plurality of output variables corresponding thereto with the input layer 41000 and the output layer 44000 of the artificial neural network model 40000, respectively, and adjusting the synaptic values between the nodes included in the input layer 41000, the hidden layers 42000 to 43000, and the output layer 44000, training may be made to enable a correct output corresponding to a particular input to be extracted. Through such a training phase, it is possible to identify the characteristics hidden in the input variables of the artificial neural network model 40000, and to adjust synaptic values (or weights) between the nodes of the artificial neural network model 40000 so that an error between an output variable calculated based on an input variable and a target output is reduced.

Figure 31:
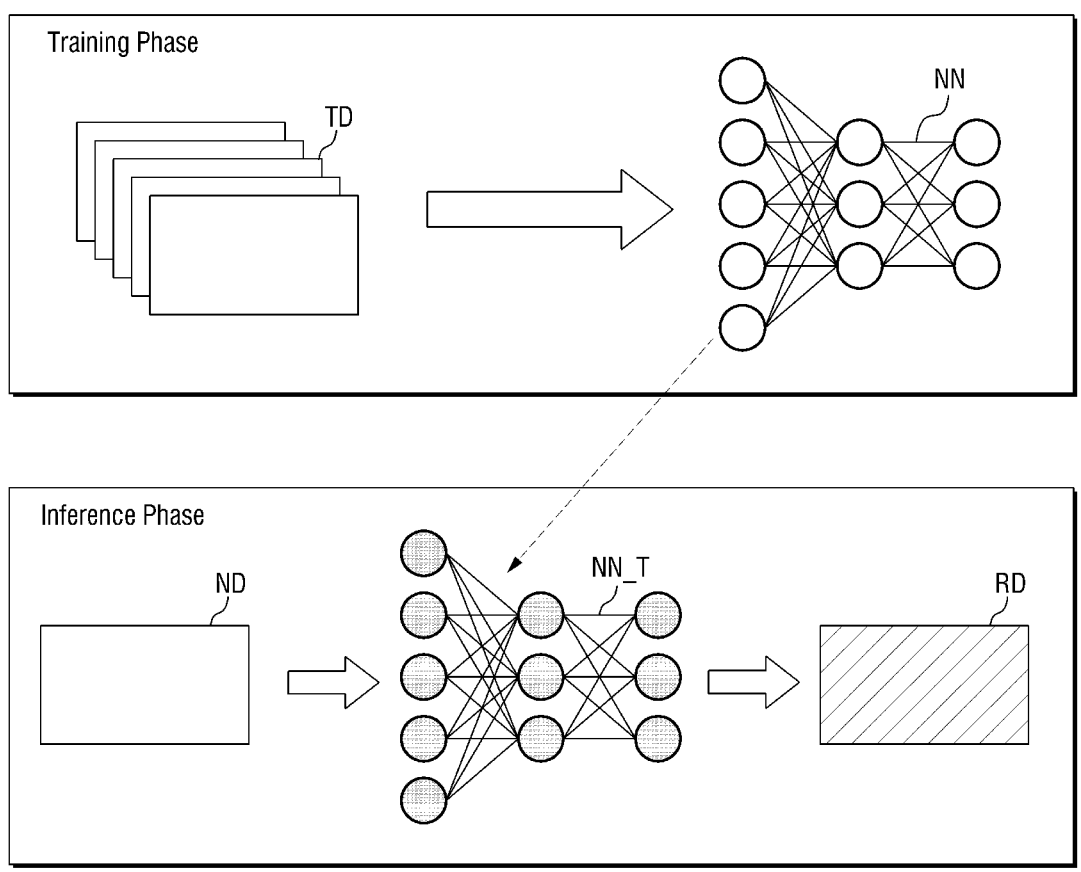
FIG. 31 is a conceptual diagram for illustrating training and inference operations of a neural network of a neural processing device in accordance with some embodiments of the disclosure.

FIG. 31 is a conceptual diagram for illustrating training and inference operations of a neural network of a neural processing device in accordance with some embodiments of the disclosure.

FIG. 31 is a conceptual diagram for illustrating training and inference operations of a neural network of a neural processing device in accordance with some embodiments of the disclosure.

In the inference phase, new data ND may be inputted into the trained neural network model NN_T again. The trained neural network model NN_T may derive result data RD through the weights and biases that have already been used in the training, with the new data ND as input. For such result data RD, what training data TD were used in training and how many pieces of training data TD were used in the training phase may be important.

Hereinafter, a method for converting data of a neural processing device, according to some embodiments of the disclosure will be described with reference to FIGS. 19 to 22 and FIGS. 32 to 34. Descriptions previously given with reference to FIGS. 1 to 31 are omitted or made briefly.

Figure 32:
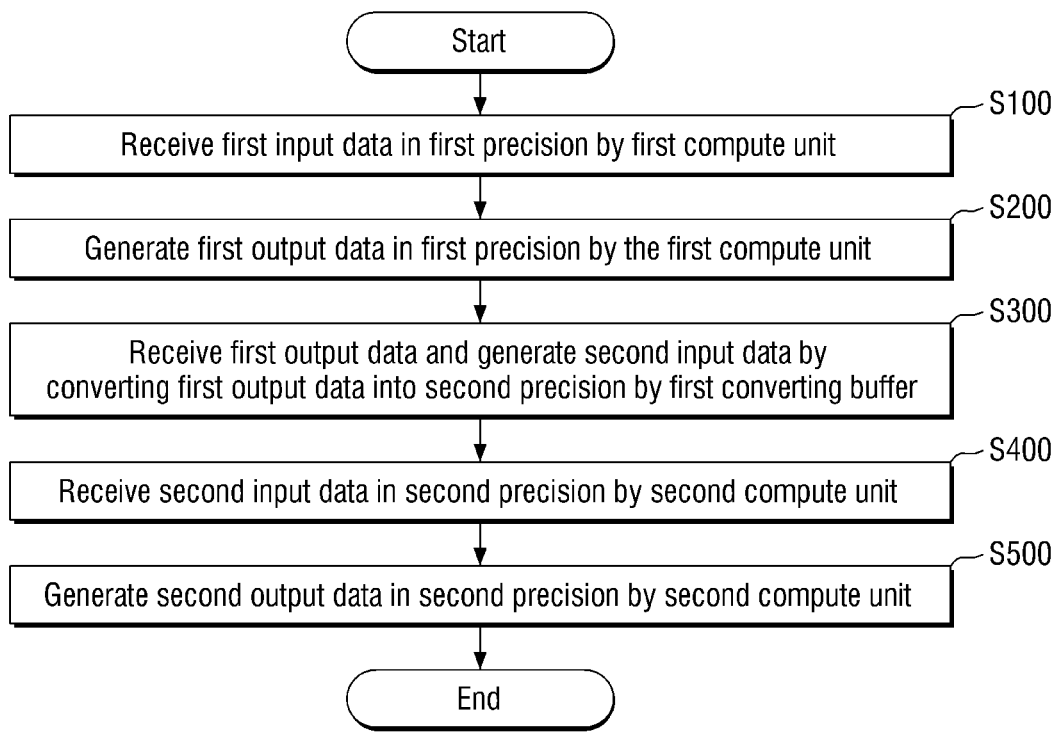
FIG. 32 is a flowchart illustrating a method for converting data of a neural processing device according to some embodiments of the disclosure.
Figure 33:
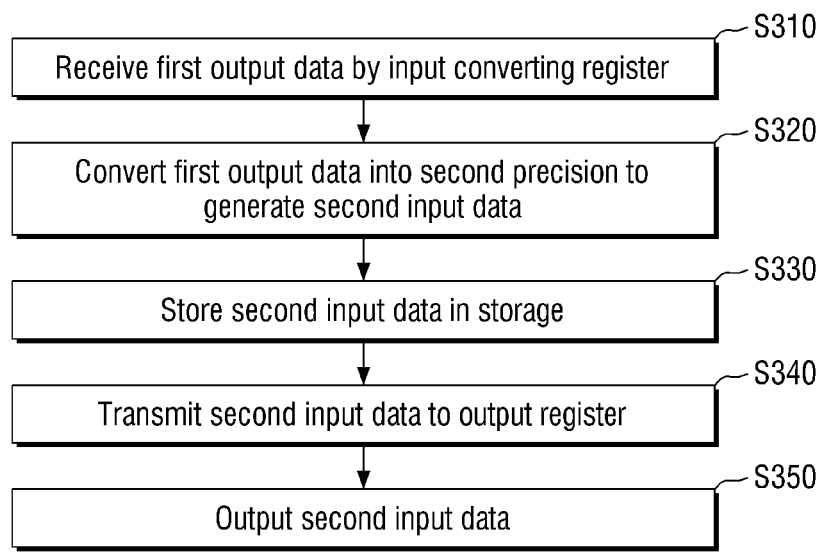
FIG. 33 is a flowchart specifically illustrating generating the second input data of FIG. 32.
Figure 34:
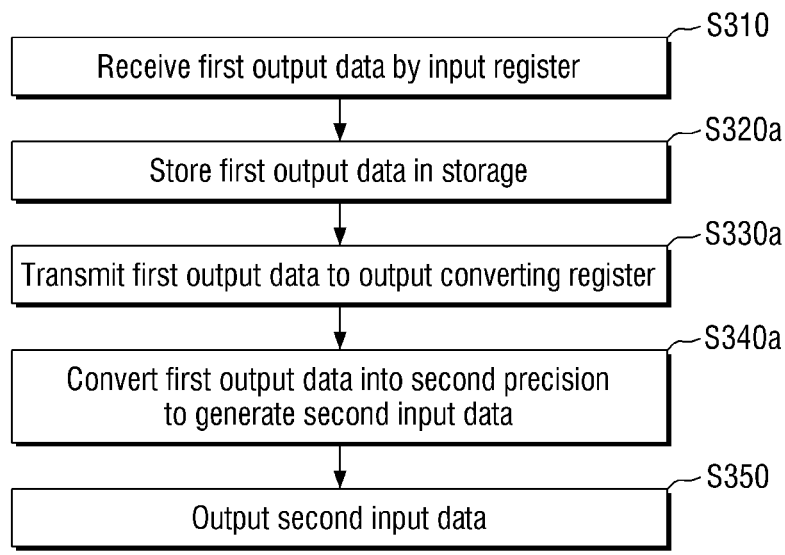
FIG. 34 is a flowchart illustrating a method for converting data of a neural processing device according to some embodiments of the disclosure.

FIG. 32 is a flowchart illustrating the method for converting data of the neural processing device according to some embodiments of the disclosure, and FIG. 33 is a flowchart specifically illustrating a step of generating second input data of FIG. 32. FIG. 34 is a flowchart illustrating a method for converting data of a neural processing device according to some embodiments of the disclosure.

Referring to FIG. 32, a first compute unit may receive first input data in first precision at S100. The first compute unit may generate first output data in the first precision at S200.

Specifically, referring to FIG. 19, the first compute unit CU1 may receive the first input data in the first precision Pr1. The first compute unit CU1 may output the first output data in the first precision Pr1 through calculations. In this case, the first precision Pr1 of the first input data may have the same number of bits as the first precision Pr1 of the first output data, but may have different number of bits from the first precision Pr1 of the first output data with same precision. That is, for example, the first input data may be int8, and the first output data may be int24. This is because result of the calculations may be values to be overflowed more than the known form.

Referring again to FIG. 32, a first converting buffer may receive the first output data and convert the first output data into second precision to generate a second input data at S300.

Specifically, referring to FIG. 33, an input register may receive the first output data at S310. Subsequently, the first output data may be converted into the second precision to generate the second input data at S320.

Specifically, referring to FIG. 21, the input converting register ICR may receive the first output data in the first precision Pr1. The input converting register ICR may convert the first output data into the second precision Pr2. The first output data may be converted into the second precision Pr2, thereby the first output data may be converted to the second input data. In other words, the second input data and the first output data may be the same data of different precisions.

Referring again to FIG. 33, the second input data may be stored in a storage at S330.

Specifically, referring to FIG. 21, the storage Mem may receive the converted second input data from the input converting register ICR and store the converted second input data. The storage Mem may temporarily store the second input data before the second input data is transmitted to the second compute unit CU2. In this case, the second input data may be in the second precision Pr2.

Referring again to FIG. 33, the second input data may be transmitted to an output register at S340. Subsequently, the second input data may be outputted at S350.

Specifically, referring to FIG. 21, the output register OR may receive the second input data in the second precision Pr2 from the storage Mem and transmit the second input data to the second compute unit CU2. The output register OR may also receive for a while data before transmitting the data to the second compute unit CU2 and transmit the data to a next clock edge.

Step S310 and step S350 of FIG. 34 may be respectively the same as the steps of FIG. 33. Referring to FIG. 34, the first output data may be stored in the storage after step S310 at S320a.

Specifically, referring to FIG. 22, the storage Mem may receive the first output data from the input register IR and store the first output data. The storage Mem may temporarily store the second input data until the second input data is transmitted to the second compute unit CU2. In this case, the first output data may be in the first precision Pr1.

Referring again to FIG. 34, the first output data may be transmitted to an output converting register at S330a. Subsequently, the first output data may be converted into the second precision to generate the second input data at S340a.

Specifically, referring to FIG. 22, the output converting register OCR may receive the first output data in the first precision Pr1 from the storage Mem and convert the first output data into the second precision Pr2. The output converting register OCR may transmit the converted first output data to the second compute unit CU2. The output register OR may also receive data for a while before transmitting the data to the second compute unit CU2, and transmit the data to a next clock edge. Accordingly, conversion may also be performed at the original latching time without greatly adding time for conversion, and thus, efficiency of data conversion may be greatly increased.

Subsequently, step S350 may be performed.

Referring again to FIG. 32, the second compute unit may receive second input data in second precision at S400. Subsequently, the second compute unit may generate second output data in the second precision at S500.

Specifically, the second compute unit CU2 may receive the second input data in the second precision Pr2. The second compute unit CU2 may output the second output data in the second precision Pr2 through calculations. In this case, the second precision Pr2 of the second input data and the second precision Pr2 of the second output data may be the same precision having the same number of bits, but may be the same precision having only the same form with different number of bits.

Hereinafter, a method for converting data of a neural processing device according to some embodiments of the disclosure will be described with reference to FIG. 27 and FIGS. 35 to 38. Descriptions previously given with reference to FIGS. 1 to 34 are omitted or made briefly.

Figure 35:
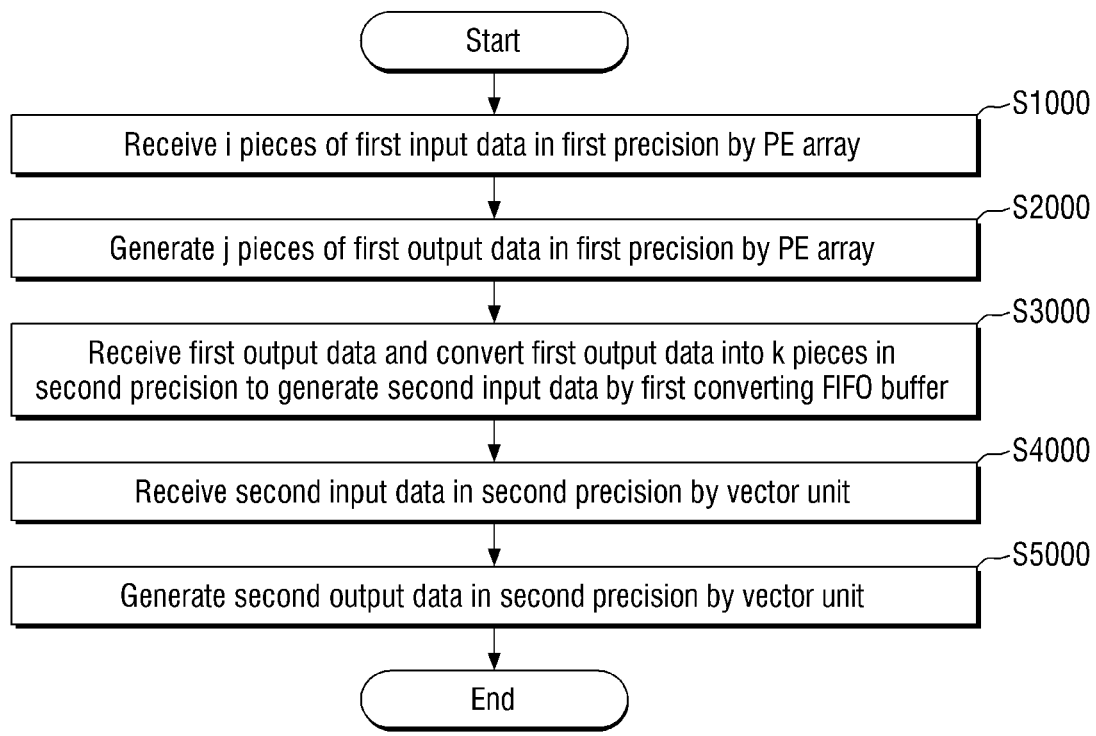
FIG. 35 is a flowchart illustrating a method for converting data of a neural processing device according to some embodiments of the disclosure.
Figure 36:
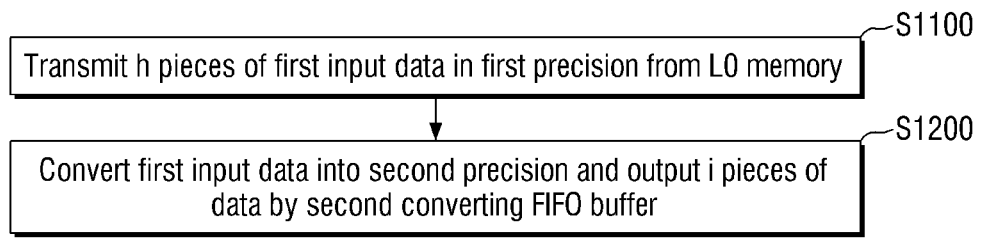
FIG. 36 is a flowchart specifically illustrating receiving the first input data of FIG. 35.
Figure 37:
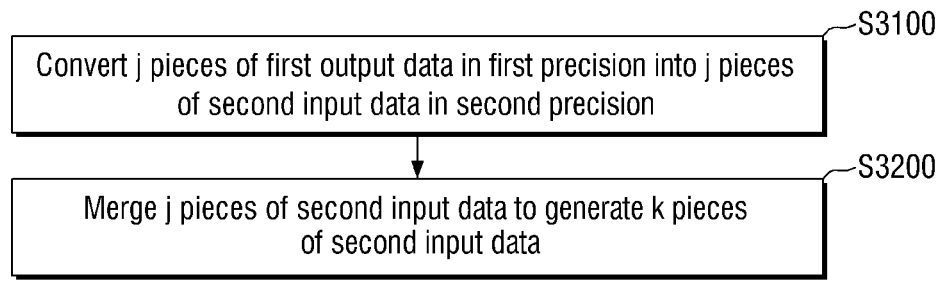
FIG. 37 is a flowchart specifically illustrating generating the second input data of FIG. 35.
Figure 38:
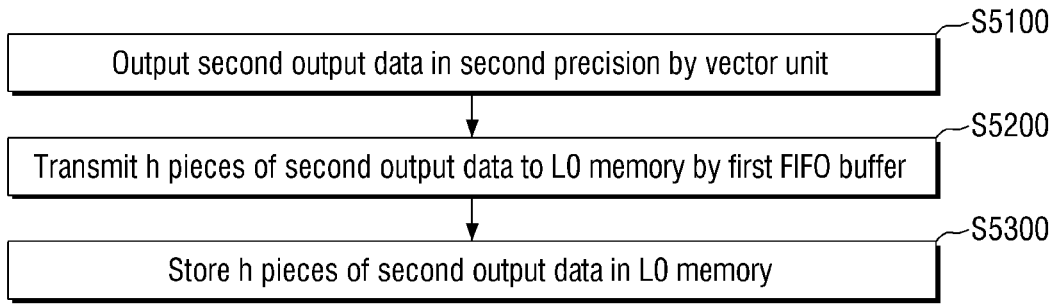
FIG. 38 is a flowchart specifically illustrating generating the second output data of FIG. 35.

FIG. 35 is a flowchart illustrating the method for converting data of a neural processing device according to some embodiments of the disclosure, and FIG. 36 is a flowchart specifically illustrating receiving the first input data of FIG. 35. FIG. 37 is a flowchart specifically illustrating generating the second input data of FIG. 35, and FIG. 38 is a flowchart specifically illustrating generating the second output data of FIG. 35.

Referring to FIG. 35, a PE array may receive i pieces of first input data in the first precision at S1000.

Specifically, referring to FIG. 36, h pieces of first input data in the first precision may be transmitted from an L0 memory at S1100. Subsequently, a second converting FIFO buffer may convert the first input data into the second precision and output i pieces of data at S1200.

Specifically, referring to FIG. 27, the second converting FIFO buffer CF2 may convert h pieces of first input data in the second precision Pr2 into the first precision Pr1 and provide i pieces of data according to the number of pieces of data that may be inputted to the PE array 163.

Referring again to FIG. 35, the PE array may generate j pieces of first output data in the first precision at 52000.

Specifically, referring to FIG. 27, the PE array 163 may perform two-dimensional calculations and output j pieces of first output data in the first precision Pr1. In this case, j may be different from i. However, the embodiment is not limited thereto.

Referring again to FIG. 35, the first converting FIFO buffer may receive the first output data and convert the first output data into k pieces in second precision to generate the second input data at 53000.

Specifically, referring to FIG. 37, j pieces of first output data in the first precision may be converted into j pieces of second input data in the second precision at 53100. Subsequently, the j pieces of the second input data may be merged to generate k pieces of second input data at 53200.

Specifically, referring to FIGS. 26 and 27, the first converting FIFO buffer CF1 may generate the first output data Do1 by converting the first input data Di1 into the second precision Pr2. The first converting FIFO buffer CF1 may generate the second output data Do2 by converting the second input data Di2 into the second precision Pr2. In this case, the first input data Di1 and the second input data Di2 may be the first output data. The first output data Do1 and the second output data Do2 may be the second input data.

The first converting FIFO buffer CF1 may generate the output data Do by merging the first output data Do1 and the second output data Do2. In this case, the output data Do may include a plurality of pieces of data of 8 bits or 1 byte.

The first converting FIFO buffer CF1 may perform internal processing, and accordingly, the number of input data may be different from the number of output data. That is, the first converting FIFO buffer CF1 may receive j pieces of first output data and output k pieces of second input data. In this case, i and k may be the same as or different from each other.

Referring again to FIG. 35, a vector unit may receive the second input data in the second precision at 54000. Subsequently, the vector unit may generate the second output data in the second precision at 55000.

Specifically, referring to FIG. 38, the vector unit may output the second output data in the second precision S5100. Subsequently, a first FIFO buffer may transmit h pieces of the second output data to an L0 memory at 55200. Subsequently, the L0 memory may store h pieces of second output data.

Specifically, referring to FIG. 27, the first FIFO buffer FF1 may receive the second output data in the second precision Pr2 and transmit the second output data to the L0 memory 120 without conversion. In this case, according to the number of pieces of data that may be inputted to the L0 memory 120, the first FIFO buffer FF1 may transmit h pieces of second output data.

Hereinafter, the method for converting data of the neural processing device according to some embodiments of the disclosure will be described with reference to FIGS. 28, 35, 39, and 40. Descriptions previously given with reference to FIGS. 1 to 38 are omitted or made briefly.

Figure 39:
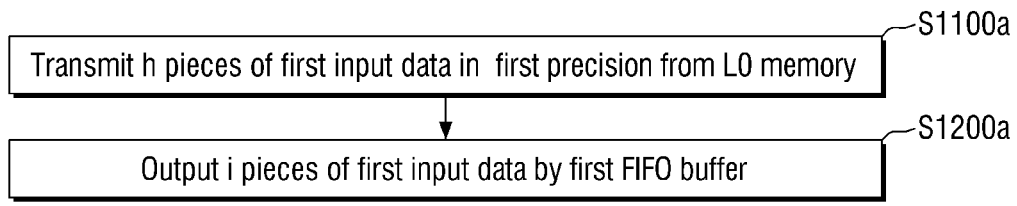
FIG. 39 is a flowchart specifically illustrating receiving the first input data of FIG. 35.
Figure 40:
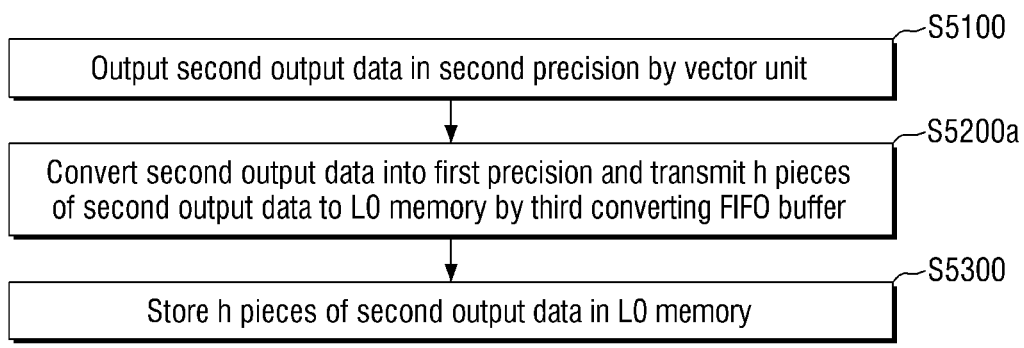
FIG. 40 is a flowchart specifically illustrating generating the second output data of FIG. 35.

FIG. 39 is a flowchart specifically illustrating receiving the first input data of FIG. 35, and FIG. 40 is a flowchart specifically illustrating generating the second output data of FIG. 35.

Referring to FIG. 39, h pieces of first input data in the first precision may be transmitted from the L0 memory at S1100a. Subsequently, the first FIFO buffer may output i pieces of first input data at S1200a.

Specifically, referring to FIG. 28, the L0 memory 120 may provide h pieces of first input data in the second precision Pr2 to the second FIFO buffer FF2 after receiving h pieces of second output data. The second FIFO buffer FF2 may provide the h pieces of the first input data in the first precision Pr1 as i pieces of data according to the number of data that may be inputted to the PE array 163.

Referring to FIG. 40, descriptions of step S5100 and step S5300 may be the same descriptions of FIG. 38. After step S5100, a third converting FIFO buffer may convert the second output data into the first precision and transmit h pieces of second output data to the L0 memory at 55200a.

Specifically, referring to FIG. 28, the third converting FIFO buffer CF3 may receive the second output data in the second precision Pr2 and convert the second output data into the first precision Pr1. The third converting FIFO buffer CF3 may transmit the converted second output data to the L0 memory 120. In this case, the third converting FIFO buffer CF3 may transmit the h pieces of the second output data according to the number of data that may be inputted to the L0 memory 120.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims. It is therefore desired that the embodiments be considered in all respects as illustrative and not restrictive, reference being made to the appended claims rather than the foregoing description to indicate the scope of the disclosure.

What is claimed is:

1. A neural processing device comprising:
a first processing element (PE) array configured to receive first input data in first precision and generate first output data in the first precision by performing two-dimensional matrix multiplication in the first precision;
a second PE array configured to receive second input data in second precision which is different from the first precision and generate second output data in the second precision by performing one-dimensional calculations in the second precision; and
a first converting buffer connected to the first PE array and the second PE array and configured to receive and store the first output data, generate the second input data by converting the first output data into the second precision, and transmit the second input data to the second PE array,
wherein the first converting buffer comprises:
an input converting register configured to receive the first output data in the first precision and convert the first output data into the second input data in the second precision,
a storage configured to receive the second input data from the input converting register and store the second input data, and
an output register configured to receive the second input data from the storage and transmit the second input data to the second PE array.

2. The neural processing device of claim 1, further comprising:
a second converting buffer configured to convert the first input data in the second precision into the first precision and provide the converted first input data to the first PE array.

3. The neural processing device of claim 2, further comprising:
a memory unit configured to store the second output data in the second precision and provide the first input data in the second precision to the second converting buffer.

4. The neural processing device of claim 1, further comprising:
a third converting buffer configured to receive the second output data in the second precision from the second PE array and convert the second output data into the first precision.

5. The neural processing device of claim 1, wherein the first converting buffer has a first in first out (FIFO) structure.

6. The neural processing device of claim 1, wherein the first PE array has a coarse-grained reconfigurable array (CGRA) structure.

7. The neural processing device of claim 1, wherein a number of the first output data is different from a number of the second input data.

8. A method for converting data of a neural processing device, comprising:
receiving first input data in first precision by a first processing element (PE) array;
generating first output data in the first precision by the first PE array;
generating, by a first converting buffer connected to the PE array and a second PE array, second input data by receiving the first output data and converting the first output data into second precision different from the first precision,
wherein generating the second input data comprises:
receiving the first output data by an input register,
storing the first output data in a storage,
transmitting the first output data to an output converting register,
generating the second input data by converting the first output data into the second precision, and
outputting the second input data;
receiving the second input data in the second precision by the second PE array; and
generating second output data in the second precision by the second PE array.

9. The method for converting data of the neural processing device of claim 8, wherein
the first PE array receives i pieces of first input data in the first precision and generates j pieces of the first output data in the first precision.

10. The method for converting data of the neural processing device of claim 9, wherein
the first converting buffer has a FIFO structure, and
the first converting buffer receives the j pieces of first output data and converts the j pieces of the first output data into k pieces of the second input data in the second precision.

11. The method for converting data of the neural processing device of claim 10, wherein
the second PE array performs one-dimensional calculations, receives the k pieces of the second output data, and generates the second output data.

12. The method for converting data of the neural processing device of claim 11, wherein generating the second output data comprises:
- outputting the second output data in the second precision by the second PE array;
- transmitting, by a first FIFO buffer, h pieces of the second output data to an L0 memory; and
- storing the h pieces of the second output data in the L0 memory.

13. The method for converting data of the neural processing device of claim 10, wherein converting into the k pieces of the second input data in the second precision comprises:
- converting the j pieces of the first output data in the first precision into j pieces of the second input data in the second precision; and
- generating k pieces of the second input data in the second precision by merging the j pieces of the second input data in the second precision.

14. The method for converting data of the neural processing device of claim 8, wherein receiving the first input data comprises:
- transmitting h pieces of the first input data in the first precision by an L0 memory; and
- receiving the first input data and outputting i pieces of the first input data in the first precision by a first FIFO buffer.

* * * * *